US008676893B1

(12) United States Patent
Teller

(10) Patent No.: US 8,676,893 B1
(45) Date of Patent: Mar. 18, 2014

(54) UTILIZING MULTIPLE TELEO-OPERATED DEVICES FOR COMMON TELEO-EXPERIENCE SESSIONS

(75) Inventor: Eric Teller, San Francisco, CA (US)

(73) Assignee: Google Inc., Mountain View, CA (US)

( * ) Notice: Subject to any disclaimer, the term of this patent is extended or adjusted under 35 U.S.C. 154(b) by 131 days.

(21) Appl. No.: 13/346,666

(22) Filed: Jan. 9, 2012

Related U.S. Application Data

(60) Provisional application No. 61/569,776, filed on Dec. 12, 2011.

(51) Int. Cl.
*G06F 15/16* (2006.01)

(52) U.S. Cl.
USPC .......................................................... 709/204

(58) Field of Classification Search
CPC .................................................. H04L 12/1818
USPC .......................................................... 709/204
See application file for complete search history.

(56) References Cited

U.S. PATENT DOCUMENTS

| 7,587,747 | B2 | 9/2009 | Maguire, Jr. | |
|---|---|---|---|---|
| 7,949,616 | B2 | 5/2011 | Levy et al. | |
| 2010/0131103 | A1 * | 5/2010 | Herzog et al. | 700/259 |
| 2011/0190930 | A1 | 8/2011 | Hanrahan et al. | |
| 2011/0288682 | A1 * | 11/2011 | Pinter et al. | 700/259 |

FOREIGN PATENT DOCUMENTS

| GB | 2469828 A | 11/2010 |
|---|---|---|

OTHER PUBLICATIONS

D. Schulz et al., "Web Interfaces for Mobile Robots in Public Places," IEEE Robotics & Automation Magazine, Mar. 2000, pp. 48-56, vol. 7, Issue 1, IEEE Robotics and Automation Society, available at http://www.iai.uni-bonn.de/—schulz/articles/web-ram-00.pdf (last visited Jan. 9, 2012).

W. Burgard et al., "Tele-Presence in Populated Exhibitions Through Web-Operated Mobile Robots," Autonomous Robots, Nov. 2003, pp. 299-316, vol. 15, Issue 3, available at http://www.ics.forth.gr/webfair/papers/burgard03__ar__telepresence.pdf (last visited Jan. 9, 2012).

* cited by examiner

*Primary Examiner* — Larry Donaghue
*Assistant Examiner* — Marshall McLeod
(74) *Attorney, Agent, or Firm* — McDonnell Boehnen Hulbert & Berghoff LLP

(57) ABSTRACT

Methods and apparatus related to teleo-experience sessions are disclosed. A server coordinates a common teleo-experience session for a plurality of P participant devices, each configured to receive media content from one or more teleo-operated devices of a plurality of D teleo-operated devices, with P greater than D. A plurality of teleo-control requests are received at the server that specify at least two preferred options for at least one parameter of the teleo-experience session related to the plurality of D teleo-operated devices. The server determines whether the at least two preferred options conflict. If the least two preferred options conflict, the server selects an option for the at least one parameter based on the at least two preferred options and sends at least one teleo-control instruction based on the selected option for the at least one parameter.

46 Claims, 11 Drawing Sheets

450E

450F

UTILIZING MULTIPLE TELEO-OPERATED DEVICES FOR COMMON TELEO-EXPERIENCE SESSIONS

CROSS-REFERENCE TO RELATED APPLICATIONS

This application claims priority to U.S. Provisional Patent Application No. 61/569,776, entitled "Utilizing Multiple Teleo-Operated Devices for Common Teleo-Experience Sessions", filed on Dec. 12, 2011, which is incorporated by reference herein for all purposes.

BACKGROUND

Unless otherwise indicated herein, the materials described in this section are not prior art to the claims in this application and are not admitted to be prior art by inclusion in this section.

There are numerous locations that "teleo-operated" or remotely-operated devices, but not people, can feasibly be transported to. For example, unmanned vehicles have been, are, and will be used to explore remote regions of the earth, such as deep-sea and polar regions, as well as extra-terrestrial destinations such as the Moon, other planets, asteroids, and perhaps comets. Additionally, teleo-operated devices may be permitted to operate certain environments closed to the general public; such as after-hours at a museum or in a locker room a few hours before a major sporting event. As teleo-operated devices can go places that regular people cannot go, teleo-operated devices can be used for tourism.

However, touring with teleo-operated devices can be limiting in environments where one or a few devices are permitted to operate, as the teleo-operated device(s) in the environment may be controlled to go places that some, but not all, tour members desire to go.

SUMMARY

In one aspect of the disclosure of the application, a computer-implemented method is provided. A server coordinates a common teleo-experience session for a plurality of P participant devices each configured to receive media content from one or more teleo-operated devices of a plurality of D teleo-operated devices, with P is greater than D. The server can coordinate the common teleo-experience session by at least: (i) receiving a plurality of teleo-control requests from the plurality of P participant devices, where the plurality of teleo-control requests specifies at least two preferred options for at least one parameter of the common teleo-experience session, and where the plurality of teleo-control requests relate to the plurality of D teleo-operated devices, (ii) determining whether the at least two preferred options for the at least one parameter conflict, and (iii) in response to determining that the at least two preferred options for the at least one parameter conflict, the server: (a) selects an option for the at least one parameter, where the selected option is based at least in part on the at least two preferred options, and (b) sends at least one teleo-control instruction based on the selected option for the at least one parameter.

In another aspect of the disclosure of the application, a server is provided. The server includes at least one processor and a non-transitory computer-readable medium. The non-transitory computer-readable medium has one or more instructions that, in response to execution by the at least one processor, cause the server perform functions including: (A) coordinating a common teleo-experience session for a plurality of P participant devices each configured to receive media content from one or more teleo-operated devices of a plurality of D teleo-operated devices, P greater than D, by at least: (i) receiving a plurality of teleo-control requests from the plurality of P participant devices, where the plurality of teleo-control requests specifies at least two preferred options for at least one parameter of the common teleo-experience session, and where the plurality of teleo-control requests relate to the plurality of D teleo-operated devices, (ii) determining whether the at least two preferred options for the at least one parameter conflict, and (iii) in response to determining that the at least two preferred options for the at least one parameter conflict: (a) selecting an option for the at least one parameter, where the selected option is based at least in part on the at least two preferred options, and (b) sending at least one teleo-control instruction related to the common teleo-experience session based on the selected option for the at least one parameter.

In yet another aspect of the disclosure of the application, a system is provided. The system includes means for coordinating a common teleo-experience session for a plurality of P participant devices each configured to receive media content from one or more teleo-operated devices of a plurality of D teleo-operated devices, where P is greater than D. The means for coordinating include: (i) means for receiving a plurality of teleo-control requests from the plurality of P participant devices, where the plurality of teleo-control requests specifies at least two preferred options for at least one parameter of the common teleo-experience session, and where the plurality of teleo-control requests relate to the plurality of D teleo-operated devices, (ii) means for determining whether the at least two preferred options for the at least one parameter conflict, and (iii) means for, in response to determining that the at least two preferred options for the at least one parameter conflict: (i) selecting an option for the at least one parameter, where the selected option is based at least in part on the at least two preferred options, and (ii) sending at least one teleo-control instruction based on the selected option for the at least one parameter.

In still another aspect of the disclosure of the application, a computer-implemented method is provided. A server receives plurality of teleo-control requests related to a teleo-experience session from two or more of a number of participant devices. Each teleo-control request is related to one or more of a number of teleo-operated devices. The number of participant devices is greater than the number of teleo-operated devices. The teleo-experience session is conducted using a first teleo-operated device of the number of teleo-operated devices. A first participant device and a second participant device of the number of participant devices are each connected to the teleo-experience session via the first teleo-operated device. The server determines whether the teleo-experience session requires use of a second teleo-operated device that differs from the first teleo-operated device. In response to determining that the teleo-experience session requires use of the second teleo-operated device, the server maintains a first connection to the teleo-experience session between the first participant device and the first teleo-operated device, and establishes a second connection to the teleo-experience session between the second participant device and the second teleo-operated device.

In even another aspect of the disclosure of the application, a server is provided. The server includes at least one processor and a non-transitory computer-readable medium. The non-transitory computer-readable medium has one or more instructions that, in response to execution by the at least one processor, cause the server perform functions including: (i) receiving a plurality of teleo-control requests related to a teleo-experience session from two or more of a number of participant devices, where each teleo-control request is related to one or more of a number of teleo-operated devices, where the number of participant devices is greater than the number of teleo-operated devices, where the teleo-experience session is conducted using a first teleo-operated device of the number of teleo-operated devices, and where a first participant device and a second participant device of the number of participant devices are each connected to the teleo-experience session via the first teleo-operated device, (ii) determining whether a second teleo-operated device is needed by the teleo-experience session, where the first teleo-operated device differs from the second teleo-operated device; and (iii) in response to determining that the second teleo-operated device is needed by the teleo-experience session: (a) maintaining a first connection to the teleo-experience session between the first participant device and the first teleo-operated device, and (b) establishing a second connection to the teleo-experience session between the second participant device and the second teleo-operated device.

In yet even another aspect of the disclosure of the application, a system is provided. The system includes: (i) means for receiving a plurality of teleo-control requests related to a teleo-experience session from two or more of a number of participant devices, where each teleo-control request is related to one or more of a number of teleo-operated devices, where the number of participant devices is greater than the number of teleo-operated devices, where the teleo-experience session is conducted using a first teleo-operated device of the number of teleo-operated devices, and where a first participant device and a second participant device of the number of participant devices are each connected to the teleo-experience session via the first teleo-operated device, (ii) means for determining whether the teleo-experience session requires use of a second teleo-operated device, where the first teleo-operated device differs from the second teleo-operated device, and (iii) means for, in response to determining that the teleo-experience session requires use of the second teleo-operated device: (a) maintaining a first connection to the teleo-experience session between the first participant device and the first teleo-operated device, and (b) establishing a second connection to the teleo-experience session between the second participant device and the second teleo-operated device.

In an additional aspect of the application, a computer-implemented method is provided. A server receives a plurality of teleo-control requests related to a teleo-experience session from two or more of a number of participant devices. Each teleo-control request is related to one or more of a number of teleo-operated devices. The number of participant devices is greater than the number of teleo-operated devices. The plurality of teleo-control requests include a first teleo-control request indicating a first preferred option for a parameter of the teleo-experience session related to a first teleo-operated device of the number of teleo-operated devices, and a second teleo-control request indicating a second preferred option for the parameter of the teleo-experience session related to the first teleo-operated device. The server selects an option from among at least the first preferred option and the second preferred option for the parameter of the teleo-experience session. In response to selecting the option for the parameter, the server selects a second teleo-operated device of the number of teleo-operated devices, where the first teleo-operated device differs from the second teleo-operated device, and coordinating the teleo-experience session utilizing at least the first and second teleo-operated devices.

DETAILED DESCRIPTION

Overview

Figure 1:
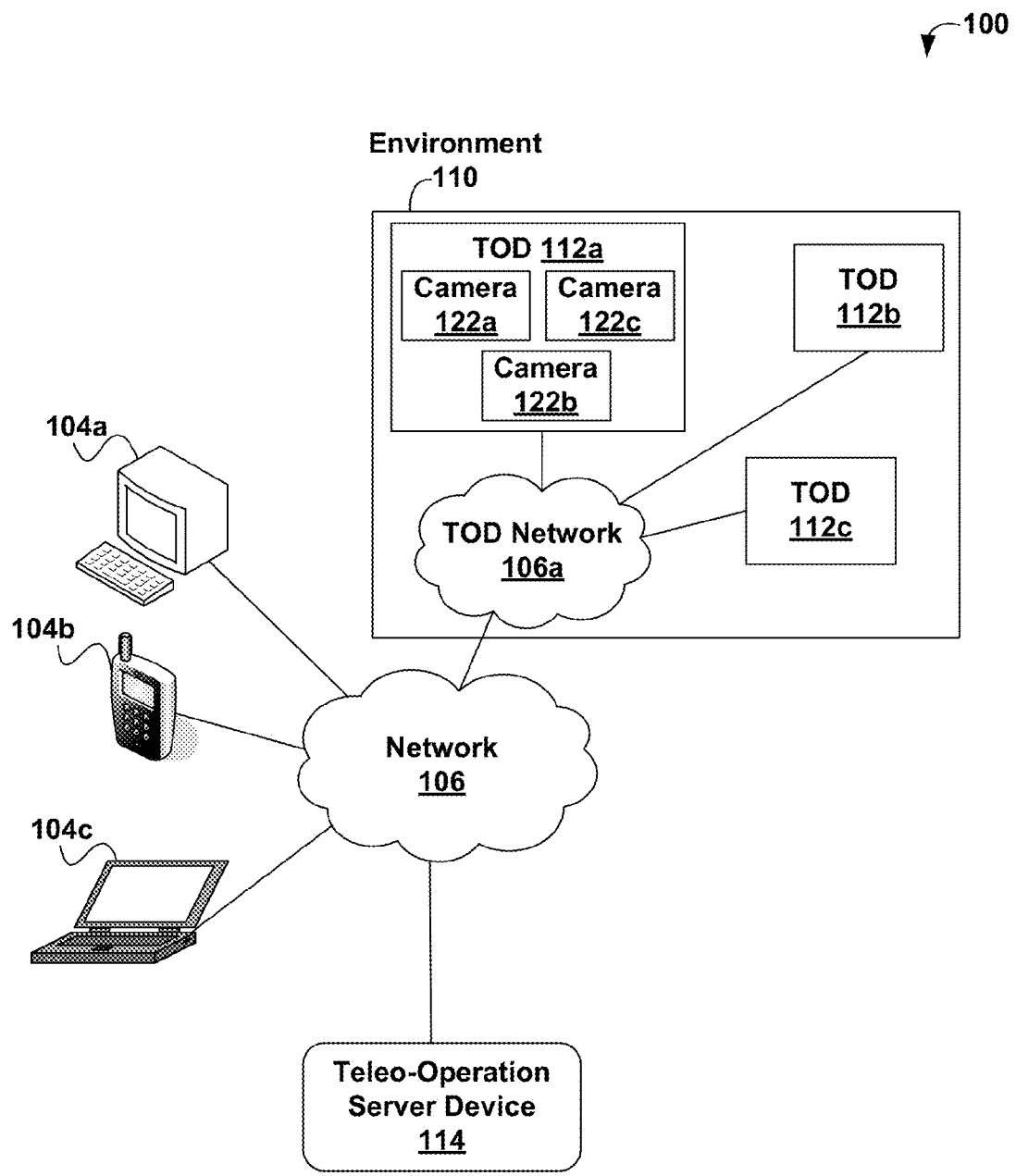
FIG. 1 depicts an example system with teleo-operated devices functioning within an environment.

Teleo-operated devices can be used to conduct "teleo-experience sessions" that allow people to virtually visit various locations, including hard-to-reach, hazardous, and otherwise restricted areas. For example, teleo-operated devices could be transported to the surface of the Moon. Then, a participant of a teleo-experience session can provide requests to the teleo-operated devices as part of the teleo-experience session on where to go, how fast to travel, where to aim cameras and other sensors on the teleo-operated device, and perhaps other aspects of the teleo-experience session. These "teleo-control requests" can be used generate to "teleo-control instructions" that instruct teleo-operated devices accordingly; e.g., command teleo-operated device 1 to turn left before reaching the Copernicus Crater or to aim a camera at Mons Huygens.

In some scenarios, multiple participants can virtually share one teleo-operated device. When directing the teleo-operated device, conflicts can arise between choices made by the participants to via teleo-control requests. For example, suppose that ten participants are involved in a teleo-experience session sharing one teleo-operated device. Then, upon reaching an interesting landmark IL, suppose that three participants want to turn left at IL while the other seven want to turn right at IL. This conflict can be resolved by one of a number of techniques. For example, using "the majority rules" technique, the teleo-operated device can be commanded to turn right based on the majority of participants' votes to turn right.

In some scenarios involving variables with a range of possible values, such as some numerical values, averaging or other mathematical techniques can be used to resolve conflicting choices. For example, suppose a speed of a teleo-operated device can be specified in terms of 0-100 units (e.g., miles/hour, km/hour, m/s). Then, suppose the above-mentioned ten participants vote for the speed of the teleo-operated device as follows: 50, 50, 48, 47, 45, 45, 45, 44, 41, and 40. The average of these ten speed votes is 45.5 and the median and mode votes are each 45. Then, the speed of the teleo-operated device can be set to 45.5, using an averaging technique, or 45, using a median or mode technique. Similar techniques can be used for other ranged variables; such as but not limited to teleo-operated device or sensor steering instructions specified in numerical terms such as degrees or radians, acceleration rates, braking rates, fuel/energy usage rates.

If multiple teleo-operated devices are operating in the environment, then conflicts can be resolved using multiple-device techniques. Continuing the example above, suppose that another teleo-operated device is also near to interesting landmark IL and plans to turn left at IL. Then, the three participants that want to turn left can be given an option to either stay with the right-turning teleo-operated device or change devices and wait for the left-turning teleo-operated device. As another example, suppose the right-turning teleo-operated device is instructed not to just turn right at IL, but plans to circle back to IL after the initial right turn. In this case, the three participants that want to turn left can be given an option to either stay with the right-turning teleo-operated device or wait at IL for the right-turning teleo-operated device to circle back.

In some cases, a "controlling participant" can be selected to control a teleo-operated device. For example, the controlling participant can be a professional, such as a trained teleo-operated device operator, a tour guide, or some other professional controlling participant. As another example, one or more of the participants of the teleo-experience session can control the teleo-operated device for part or all of the teleo-experience session. For example, one or more participants can each be given an amount of time to control the teleo-operated device as the controlling participant. When the amount of time expires, another participant can be designated as the controlling participant for an amount of time. The amounts of time that each controlling participant is in control of the teleo-operated device can be the same for each controlling participant or can vary among the controlling participants.

In some scenarios, the teleo-operated devices can be configured to go on fixed routes through the environment with designated "way-points" where device routes intersect. Then, participants waiting for another teleo-operated device to resolve a conflict can wait at a way-point. In some scenarios, cameras and/or other sensors can be placed at the way-point. Then, waiting participants can explore the area at or near the way-point via video feeds and/or sensory output from the cameras and/or other sensors placed at the way-point. In other scenarios, participants can agree to stop a teleo-operated device at a way-point for a period of time and explore the way-point area via these video feeds and/or sensory output.

The use of multiple teleo-operated devices can allow more people to explore the environment than would otherwise be possible. Also, by taking multiple paths through the environment that are partially or completely controlled by the participants of a teleo-experience session, participants can see different features of the environment than using a single teleo-operated device traveling along a fixed course. Multiple-device conflict resolution techniques can be used to increase participant satisfaction with the teleo-experience session by permitting additional choices and allowing participants to switch to devices that better reflect individual participant choices during a teleo-experience session.

System and Device Architecture

FIG. 1 depicts an example system 100 with teleo-operated devices (TODs) 112a, 112b, and 112c functioning within environment 110. In FIG. 1, teleo-operation server device 114 is configured to communicate, via a network 106, with client devices 104a, 104b, and 104c. Teleo-operation server device 114 also is configured to communicate, via network 106, with one or more of teleo-operated devices 112a-112c. In some embodiments, teleo-operation server device 114 can communicate with each of teleo-operated devices 112a-112c; while in other embodiments, teleo-operation server device 114 can communicate with a subset of the teleo-operated devices 112a-112c. In even other embodiments, one or more client devices 104a-104c can be in communication with more than one of teleo-operated devices 112a-112c concurrently.

Some or all of client devices 104a-104c and perhaps other devices can act as a "participant device", or a device that enables a participant or user to experience a teleo-experience session and to make teleo-control requests and/or receive teleo-control instructions related to the teleo-experience session. The teleo-experience session can be coordinated by teleo-operation server device 114 and or one or more teleo-operated devices 112a-11c.

In some embodiments, a teleo-operated device can include one or more video cameras. FIG. 1 shows teleo-operated device 112a with three cameras: camera 122a facing in a direction of forward motion of teleo-operated device 112a, camera 122b configured to move in a plane corresponding to a top surface of teleo-operated device 112a, and camera 122c facing in a direction of backward motion of teleo-operated device 122a. In other embodiments, teleo-operated device 112a can have more or fewer cameras.

Each camera 122a-122c can be configured to take still and/or video images. Once the images are taken, teleo-operated device 112a can be configured to store and/or provide the images as a "video feed" to teleo-operation server device 114. Teleo-operation server 114 can, in turn, provide received video feeds to one or more of client devices 104a-104c.

Environment 110 can be within a building, such as, but not limited to, a museum, concert hall, stadium, movie studio building, or factory. Environment 110 can also be partially or completely outside of a building, such as a park, a campus, an open field, or other place where teleo-operated devices can operate. In some scenarios, environment 110 can be a place where people might have difficulty visiting, and possibly even surviving, such as arctic regions, deep-sea areas, locations where a disaster has recently occurred, accident sites, a battlefield, and/or extra-terrestrial locations, such as the surface of the Moon, an asteroid, a comet, or a planet other than Earth.

Network 106 can include a LAN, a wide area network (WAN), a corporate intranet, the public Internet, one or more wireless networks, one or more satellites, or any other type of network configured to provide a communications path between networked computing devices. The network 106 can also correspond to a combination of one or more LANs, WANs, wireless networks, corporate intranets, satellite networks, and/or the public Internet.

In some embodiments, teleo-operated devices 112a-112c can communicate with each other using teleo-operated device network 106a. Teleo-operated device network 106a can utilize a mesh, star, ring, and/or other type of network topology for communication. Teleo-operated device network 106a can be part of network 106 or, in particular embodiments, the network of teleo-operated devices can be distinct from network 106. Teleo-operated device network 106a can be configured to share data between teleo-operated devices 112a-112c and network 106 via a gateway device; e.g., teleo-operation server device 114.

Although FIG. 1 only shows three client devices, system 100 can serve tens, hundreds, or thousands of client devices. Moreover, client devices 104a, 104b, and 104c (or any additional client devices) can be any sort of computing device, such as a laptop computer, desktop computer, network terminal, wireless communication device (e.g., a cell phone or smart phone), wearable computing devices, etc. In some embodiments, client devices 104a, 104b, and 104c can be dedicated solely for electronic communications. In other embodiments, client devices 104a, 104b, and 104c can be general purpose computers that are configured to perform a number of tasks and need not be dedicated to electronic communications.

Computing Device Architecture

Figure 2A:
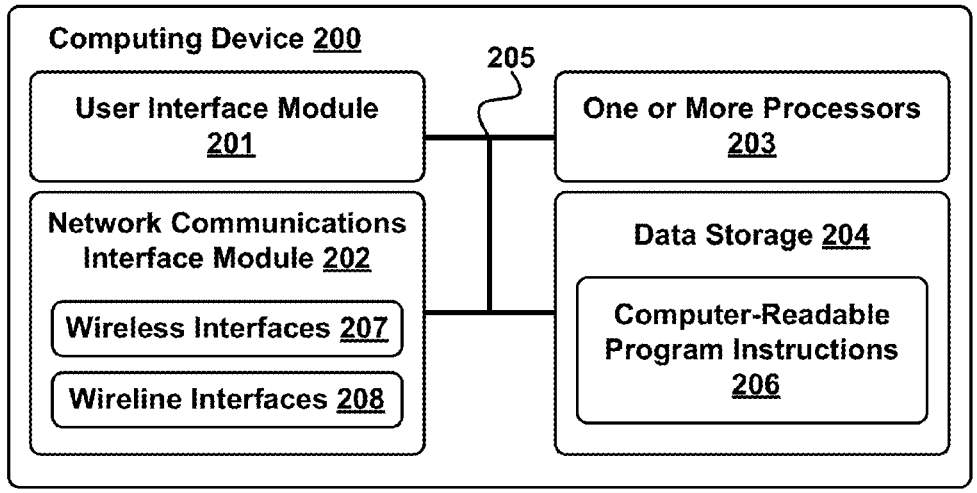
FIG. 2A is a block drawing of an example computing device.

FIG. 2A is a block diagram of a computing device (e.g., system) 200 in accordance with an example embodiment. In particular, computing device 200 shown in FIG. 2A can be configured to perform one or more functions of one or more of client devices 104a, 104b, and 104c, teleo-operated device 112a, 112b, and 112c, and teleo-operation server device 114. Computing device 200 can include user interface module 201, network-communication interface module 202, one or more processors 203, and data storage 204, all of which can be linked together via a system bus, network, or other connection mechanism 205.

In some embodiments, computing device 200 is configured to be worn; i.e., computing device 200 is a wearable computing device. For example, some or all of the components of computing device can be fashioned as a pair of eyeglasses, a wearable portable device, or another wearable form.

User interface module 201 can be operable to send data to and/or receive data from external user input/output devices. For example, user interface module 201 can be configured to send and/or receive data to and/or from user input devices such as a keyboard, a keypad, a touch screen, a computer mouse, a track ball, a joystick, one or more still and/or video cameras, one or more microphones, a voice recognition module, and/or other similar devices. User interface module 201 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 201 can also be configured to generate audible output(s), such as a speaker, speaker jack, audio output port, audio output device, earphones, and/or other similar devices.

Network-communications interface module 202 can include one or more wireless interfaces 207 and/or one or more wireline interfaces 208 that are configurable to communicate via a network, such as network 106 and/or teleo-operated device network 106a shown in FIG. 1. Wireless interfaces 207 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 208 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 202 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 203 can include one or more general purpose processors and/or one or more special purpose processors (e.g., digital signal processors, application specific integrated circuits, etc.). Processors 203 can be configured to execute computer-readable program instructions 206 that are contained in the data storage 204 and/or other instructions as described herein. The computer-readable instructions 206 can include session-control logic 206a configured to at least resolve conflicts in choices made during teleo-experience sessions as described herein.

Data storage 204 can include one or more computer-readable storage media that can be read and/or accessed by at least one of processors 203. The one or more computer-readable storage media can include volatile and/or non-volatile storage components, such as optical, magnetic, organic or other memory or disc storage, which can be integrated in whole or in part with at least one of processors 203. In some embodiments, data storage 204 can be implemented using a single physical device (e.g., one optical, magnetic, organic or other memory or disc storage unit), while in other embodiments, data storage 204 can be implemented using two or more physical devices.

Data storage 204 can include computer-readable program instructions 206 and perhaps additional data. In some embodiments, the data storage 204 can additionally include storage required to perform at least part of the herein-described methods and techniques and/or at least part of the functionality of the herein-described devices and networks.

Cloud-Based Servers

Figure 2B:
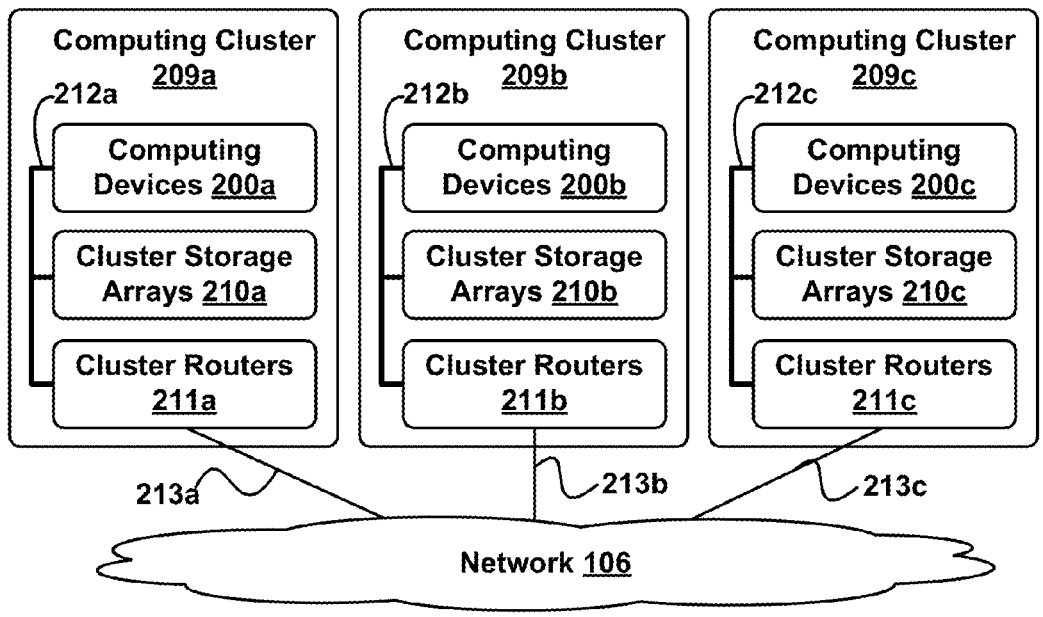
FIG. 2B is a block drawing of example computing clusters.

FIG. 2B depicts a network 106 of computing clusters 209a, 209b, 209c arranged as a cloud-based server system in accordance with an example embodiment. For example, teleo-operation server device 114 can be a cloud-based device that stores program logic and/or data of cloud-based applications and/or services. In some embodiments, teleo-operation server device 114 can be a single computing device residing in a single computing center. In other embodiments, teleo-operation server device 114 can include multiple computing devices in a single computing center, or even multiple computing devices located in multiple computing centers located in diverse geographic locations.

Teleo-operation server device 114 can store information about one or more teleo-operated devices, such as teleo-operated devices 112a, 112b, and 112c. For example, teleo-operation server device 114 can store and/or maintain location, velocity, acceleration, maintenance, fuel/energy storage, sensory type and positioning, and/or other information about teleo-operated devices. Also, or instead, teleo-operation server device 114 can store and/or maintain information received from teleo-operated devices, such as video, audio, sensory, textual, binary, and/or other types of data.

Teleo-operation server device 114 can also receive one or more teleo-control requests from a one or more "participants" or parties interested in observing an environment, such as environment 110, via teleo-operated devices. A teleo-control request can be related to one or more parameters of one or more teleo-operated devices, such as but not limited to parameters related to teleo-operated device location, velocity, acceleration, maintenance, fuel/energy storage, and/or sensors aboard a teleo-operated device.

FIG. 2B depicts a cloud-based server system in accordance with an example embodiment. In FIG. 2B, the functions of teleo-operation server device 114 can be distributed among three computing clusters 209a, 209b, and 208c. Computing cluster 209a can include one or more computing devices 200a, cluster storage arrays 210a, and cluster routers 211a connected by a local cluster network 212a. Similarly, computing cluster 209b can include one or more computing devices 200b, cluster storage arrays 210b, and cluster routers 211b connected by a local cluster network 212b. Likewise, computing cluster 209c can include one or more computing devices 200c, cluster storage arrays 210c, and cluster routers 211c connected by a local cluster network 212c.

In some embodiments, each of the computing clusters 209a, 209b, and 209c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 209a, for example, computing devices 200a can be configured to perform various computing tasks of teleo-operation server device 114. In one embodiment, the various functionalities of teleo-operation server device 114 can be distributed among one or more of computing devices 200a, 200b, and 200c. Computing devices 200b and 200c in computing clusters 209b and 209c can be configured similarly to computing devices 200a in computing cluster 209a. On the other hand, in some embodiments, computing devices 200a, 200b, and 200c can be configured to perform different functions.

In some embodiments, computing tasks and stored data associated with teleo-operation server device 114 can be distributed across computing devices 200a, 200b, and 200c based at least in part on the processing requirements of teleo-operation server device 114 the processing capabilities of computing devices 200a, 200b, and 200c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 210a, 210b, and 210c of the computing clusters 209a, 209b, and 209c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of teleo-operation server device 114 can be distributed across computing devices 200a, 200b, and 200c of computing clusters 209a, 209b, and 209c, various active portions and/or backup portions of these components can be distributed across cluster storage arrays 210a, 210b, and 210c. Additionally, some cluster storage arrays can be configured to store backup versions of data stored in other cluster storage arrays.

The cluster routers 211a, 211b, and 211c in computing clusters 209a, 209b, and 209c can include networking equipment configured to provide internal and external communications for the computing clusters. For example, the cluster routers 211a in computing cluster 209a can include one or more internet switching and routing devices configured to provide (i) local area network communications between the computing devices 200a and the cluster storage arrays 201a via the local cluster network 212a, and (ii) wide area network communications between the computing cluster 209a and the computing clusters 209b and 209c via the wide area network connection 213a to network 106. Cluster routers 211b and 211c can include network equipment similar to the cluster routers 211a, and cluster routers 211b and 211c can perform similar networking functions for computing clusters 209b and 209b that cluster routers 211a perform for computing cluster 209a.

In some embodiments, the configuration of the cluster routers 211a, 211b, and 211c can be based at least in part on the data communication requirements of the computing devices and cluster storage arrays, the data communications capabilities of the network equipment in the cluster routers 211a, 211b, and 211c, the latency and throughput of local networks 212a, 212b, 212c, the latency, throughput, and cost of wide area network links 213a, 213b, and 213c, and/or other factors that can contribute to the cost, speed, fault-tolerance, resiliency, efficiency and/or other design goals of the moderation system architecture.

Example Teleo-Operated Device

Figure 3:
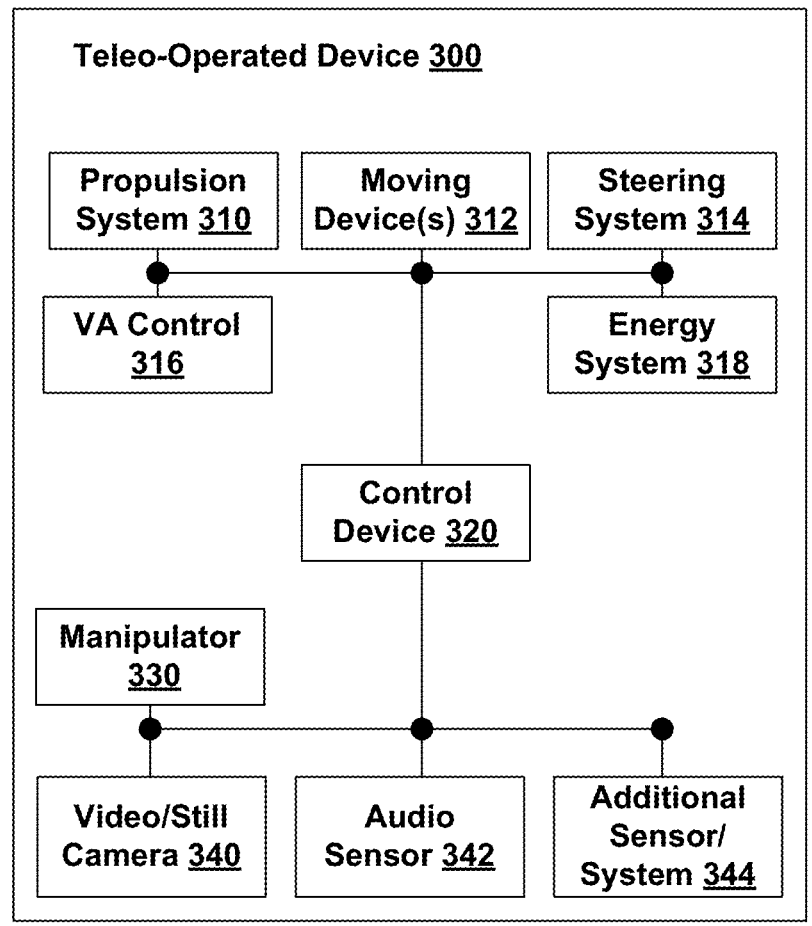
FIG. 3 is a block drawing of an example teleo-operated device.

FIG. 3 is a block drawing of example teleo-operated device 300. Teleo-operated device 300 can include a propulsion system 310, moving device(s) 312, steering system 314, velocity/acceleration (VA) control 316, energy system 318, control device 320, manipulator 330, output device 332, video/still camera 340, audio sensor 342, and additional system(s)/device(s) 344.

Propulsion system 310 is configured to provide power to move teleo-operated device as directed by steering system 314, velocity/acceleration control 316, and control device 320. For example, propulsion system 310 can be one or more dynamos, engines, generators, mechanisms, motors, power trains, and/or other devices.

Propulsion system 310 can be coupled to provide power to and move one or more moving devices 312. Example moving devices include wheels, sleds, jets, propellers, treads, and/or tracks. By powering moving devices 312, propulsion system 310 thereby enables teleo-operated device 300 to move within an environment, such as environment 110, using moving devices 312. Other propulsion systems and/or moving devices are possible as well.

Steering system 314 is configured to control a direction of travel for teleo-operated system 300. Steering system 314 can include one or more mechanisms to control a direction of travel of moving devices 312. By controlling the direction of travel of moving devices 312, steering system 312 can control the direction of travel for teleo-operated system 300. For example, steering system 312 can include steering gear, steering linkages, and/or steering wheels. Other steering systems are possible as well.

Velocity/acceleration control 316 is configured to control a velocity and/or acceleration for teleo-operated system 300. Velocity/acceleration control 316 can include one or more mechanisms, such as throttles, brakes, accelerators, pulleys, motors, belts, hydraulic devices, controllers, rotors, clutches, speed control units, to control an amount of power propulsion system 310 provides to moving devices 312. By controlling the amount of power provided by propulsion system 310, velocity/acceleration control 316 can control a velocity and/or an acceleration of teleo-operated device 300. Other velocity and/or acceleration controls are possible as well.

In some embodiments, teleo-operated device 300 can be configured as a stationary device, perhaps with controllable and/or movable sub-devices, such as manipulator 330, video/still camera 340, audio sensor 342, and/or additional sensor/system 344. In these embodiments, a stationary teleo-operated device may not include part or all of propulsion system 310, moving device(s) 312, steering system 314, and/or velocity/acceleration control 316.

Energy system 318 can include one or more devices configured to provide and contain power, fuel, electricity, and/or other types of energy used by teleo-operation device 300. In the example of a gasoline-driven teleo-operated device, energy system 318 can include a fuel tank, fuel line, injectors, and/or other devices configured to provide gasoline to propulsion system 310. In this same example, energy system 318 can include one or more batteries, wires, cables, and/or busses configured to provide electrical energy to the gasoline-driven teleo-operated device. In other embodiments, energy system 318 can utilize other forms of energy than gasoline, such as but not limited to electric batteries/generators, solar power, wind power, human/animal power, methane, natural gas, and/or hydrogen. Other energy systems are possible as well.

Control system 320 is a device configured to direct teleo-operated device 300 by sending and receiving data, processing the data, and sending and receiving control messages. For example, control system 320 can be a computing device, such as computing device 200 described above, perhaps utilizing session-control logic 206a configured to perform some or all of the herein-described functions of a teleo-operated device.

Manipulator 330 includes one or more devices configured to manipulate materials in an environment. Example manipulators include robotic arms, booms, hands, anthropomorphic manipulators, claws, shovels, scoops, buckets, tracks, treads, robotic feet, and/or tools. In some embodiments, manipulator 330 can be controlled via control messages sent by control system 320. These control messages can be generated in response to external control messages received from outside the environment instructing teleo-operated device how to move manipulator 330. In other embodiments, manipulator 330 is controllable via processors in control system 320 and/or manipulator 330 with little or no external input. Other manipulators are possible as well.

Video/still camera 340 can include cameras that are part of control device 320 and/or one or more cameras configure outside of control device 320, such as shown in FIG. 1 and discussed above. Other video/still cameras are possible as well.

Audio sensor 342 can include one or more microphones, directional microphones, sound-recording devices, and/or other audio sensors. Audio sensor 342 can be configured to capture audio. Once audio is captured, teleo-operated device 300 can be configured to store and/or provide the captured audio as one or more "audio feeds", perhaps to teleo-operation server device 114. In some embodiments, an audio feed can be provided separately from a video feed. In other embodiments, an audio feed can accompany and/or be synchronized with a video feed to provide an "audio-video feed". Other audio sensors are possible as well.

Additional system(s)/device(s) 344 can include other sensors and/or devices configured to enable teleo-operated device to perform additional functions within an environment. Example sensors and/or devices include, but are not limited to, location sensors, accelerometers, speedometers, sampling devices, chemical sensors, radiation sensors, electromagnetic sensors configured to detect non-visible light such as infrared and/or ultraviolet light, and/or chemical gas chromatographs.

An Example Environment for Teleo-Experience Sessions

FIGS. 4A-4E depict an example scenario 400 for operating teleo-operated devices. Scenario 400 includes an example environment 402 for operating teleo-operated devices, a control view of a system of teleo-operated devices, and various views provided to an example user using and controlling teleo-operated devices to navigate through the example environment.

Figure 4A:
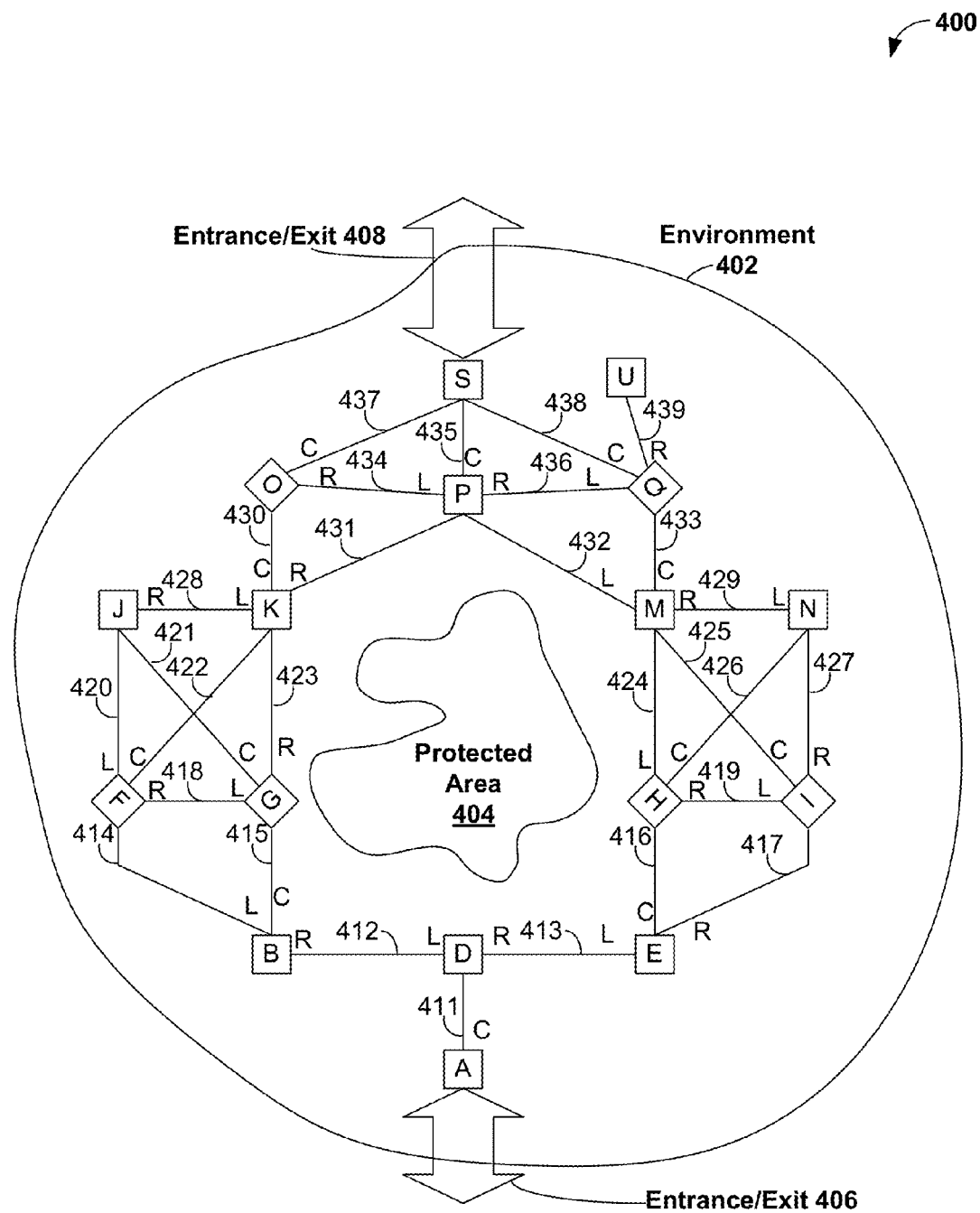
FIGS. 4A-4E depict an example scenario utilizing several teleo-operated devices in an environment.

In FIG. 4A, environment 402 includes a protected area 404, two entrances/exits 406, 408, way-points A, B, D, E, F, G, H, J, K, M, N, O, P, Q, S, and U, and paths 411-439 connecting the way-points. Teleo-operated devices can be configured to move through environment 402 by staying on paths 411-438 while changing direction only at way-points A through T. In some embodiments, teleo-operated devices may only change direction at way-points A through T. In other embodiments, teleo-operated devices may be configured to change direction at other locations in additional to waypoints A through T or possibly move freely through an environment.

Moving in a primary direction of movement from the bottom of FIG. 4A toward the top, each way-point has up to three outbound paths: a left-direction (L) path, a center-direction (C) path, and a right-direction (R) path. For example, at way-point K, left-direction path 428 leads to way-point J, center-direction path 430 leads to way-point O, and right-direction path 431 leads to way-point P. If the primary direction of movement is reversed, that is from the top of FIG. 4A to the bottom, the left-direction paths can be classified as right-direction paths and vice versa.

Additional rules can be placed on choices of direction. For example, an "ever-forward" rule can specify that no directions can be selected that move against a primary direction of movement; i.e., no backtracking is allowed. However, in other cases, backtracking may be allowed in some, but not all locations. And in yet other cases, backtracking may be allowed anywhere in environment 402.

As another example, rules against selecting a previously-chosen path can be relaxed to permit a teleo-operated device to progress. For example, suppose a teleo-operated device took path 439 from way-point Q to way-point U. However, path 439 is the only path to or from way-point U. Therefore, to permit teleo-operated device to progress from way-point U, relaxation of the rule against selecting previously-chosen path 439 is required. As another example, a set of paths can be designated as a loop that start and end at a common way-point. One example loop starts at way-point F, and involves taking paths 418, 423, and 422 to return to way-point F. Then, upon reaching the starting/ending way-point, the status of paths 418, 423, and 422 can be changed previously reached to not-previously reached to permit the teleo-operated device to progress around the loop again. Other examples are possible as well.

Rules regarding safety and/or physical constraints of a teleo-operated device can be used. For example, suppose that a teleo-operated device is unable to operate safely within protected area 404 and/or outside of the boundary of environment 402. Then, rules to restrict the operation of the teleo-operated device to "permissible locations", such as areas within the boundary of environment 402 that are outside of protected area 404, can be utilized. Also suppose that teleo-operated devices are unsafe at speeds above 100 miles per hour; in this instance, rules limiting teleo-operated device speeds to no more than 99 miles per hour can be implemented. As another example, suppose wildlife and/or natural formations present in protected area 404 are not sustainable if more than one teleo-operated device per day is permitted to operate in protected area 404. Then, rules limiting the number of teleo-operated devices operating within protected area 404 can be utilized as well. Many other rules regarding safety and/or physical constraints of a teleo-operated device as possible.

Rules that related to the duration of the teleo-experience session or tour can be specified. For example, a participant can be limited to a fixed duration for the teleo-experience session. As another example, a participant can pay more for additional time beyond the fixed duration. As a third example, a participant can get additional time in exchange for providing information, viewing informational and/or advertising messages, and/or in exchange for non-monetary credits, such as credit-card points.

Beyond choosing a direction of travel, other selections related to teleo-operated devices can be made, such as but not limited to a velocity/speed of travel, a rate of acceleration, directions and other settings of sensors such as cameras, microphones, and other sensors, and selection of one or more controlling participants who can control various aspects of the teleo-operated devices. These selections can be in turned based on rules, such as rules to limit direction choices, accelerations, velocities, speeds, sensor settings, and other choices as well.

Some choices and rules can be based on previous choices. For example, with rules indicating that teleo-operated devices are required to stay on paths 411-438 of environment 402 as shown in FIG. 4A, choosing to go to way-point M leads to rules restricting a teleo operated device to only directions along paths 424, 425, 429, 432, or 433, and to destination selections of one of way-points H, I, N, P, and Q. If the teleo-operated device were traveling in a primary direction from the bottom to the top of FIG. 4A and an ever-forward rule were in effect, the directions would be further limited to directions along path 429, 432, and 433, and the corresponding destination selection of way-points N, P, and Q.

Another possible choice may pre-determine a path through environment 402. For example, some participants can choose to take a tour where no direction selections are made by the participants. For example, a participant can enjoy a teleo-experience session conducted by one or more teleo-operated devices traveling along the path of way-points A, D, E, H, M, P, and S going at speeds between 25 and 45 miles per hour. Thus, by making a selection to travel a fixed path at certain speeds through environment 402, the participant's later speed selections are limited to values between 25 and 45 miles per hour. Many other selections of options of parameters based on previous selections of parameters made prior to or during a teleo-experience session are possible as well.

Once the selections have been made, teleo-control instructions can be sent in accord with the selected parameters. The teleo-control instructions can be sent to one or more teleo-operated devices and/or participant devices as discussed herein.

Example Views for Controlling Teleo-Operated Devices

Figure 4B:
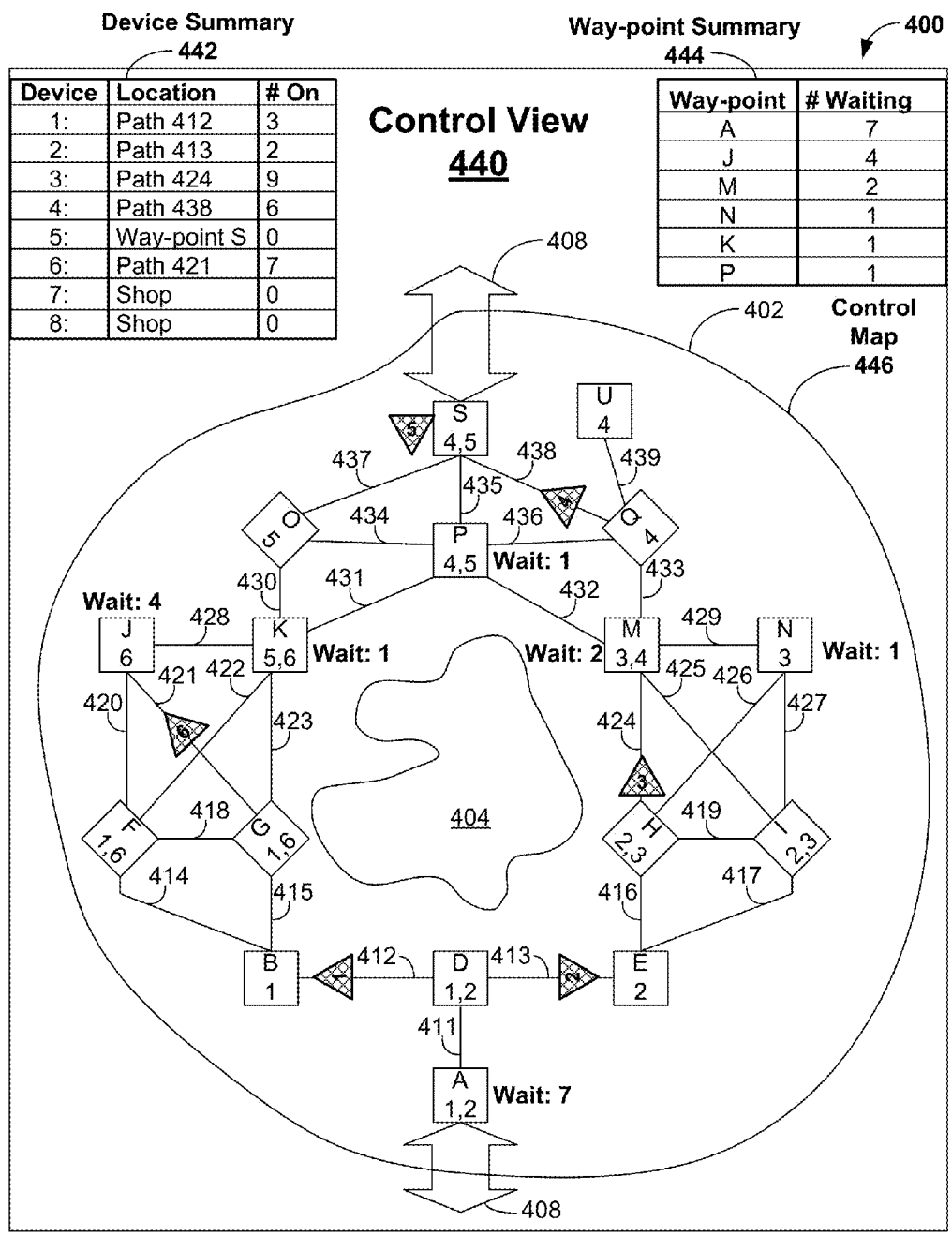

FIG. 4B shows an example control view 440 including device summary 442, way-point summary 444, and control map 446 of environment 402. Control view 440 can provide an overview of all teleo-operated devices in environment 402 to enable and assist in tracking, maintaining, and/or operating the teleo-operated devices in environment 402.

Device summary 442 display information about eight teleo-operated devices numbered 1 through 8 operating in environment 402, including a location and a number of participants using ("# On" as shown in FIG. 4B) each device. For example, FIG. 4B shows that device 3 is located on path 424 with 9 participants using device 3. Similarly, control map 446 shows device 3 as a triangle on path 424 (just to the right of the display of protected area 404 on control map 446) pointing toward the top of FIG. 4B. As another example, device summary 442 shows that device 7 is in the shop, presumably under repair, with zero participants using the device. As can be seen in FIG. 4B, control map 446 does not show the shop or device 7.

Way-point summary 444 shows a list of way-points where participants are waiting, and a number of waiting participants at each way-point. A waiting participant can be waiting at a way-point for a teleo-operated device to arrive and resolve a conflict between option choices made for a teleo-operated device that had previously been at the way-point.

For example, way-point summary 444 shows that four participants are waiting at way-point J. Similarly, control map 446 includes a "Wait: 4" indicator above way-point J, also indicating that 4 participants are waiting at way-point J. In scenario 400, way-points without waiting participants are not listed in way-point summary 444. In other embodiments not shown in the Figures, way-points without waiting participants can be listed in way-point summary 444.

As another example, suppose that five participants were using a teleo-operated device at way-point M in the primary direction toward entrance/exit 408 (going toward the top of FIG. 4B). Further suppose that three participants wanted to go forward toward way-point Q and two participants wanted to go right toward way-point N, and that selection of a direction parameter for the teleo-operated device was chosen based on popularity of the choice. To resolve this conflict between the selections of the direction parameter, session-control logic on the teleo-operated device and/or the server can determine that the conflict can be resolved by letting the three participants who wanted to go toward way-point Q stay with and direct the teleo-operated device to way-point Q. The session-control logic can also direct the two participants who wanted to go to way-point N to wait at way-point M for another teleo-operated device destined for way-point N. To finalize the resolution of the conflict, the two participants waiting at way-point M can travel with the teleo-operated device destined for way-point N.

Control map 446 shows a map of environment 402 shown in FIG. 4A. The map includes positions of devices 1-6 within environment 402 using cross-hatched triangles, where a tip of each triangle is pointed in the direction of travel for the device. For example, control map 446 of FIG. 4B shows device 4 traveling along path 438 in a direction of travel from way-point Q toward way-point S.

Each way-point is shown in FIG. 4B as a box with a letter and one or more numbers under the letter. The letter indicates the name of the way station and the number(s) indicate the device(s) that are scheduled to use that way-point. For example FIG. 4B shows way-point S is scheduled be used by devices 4 and 5.

Control map 446 also shows the way-points visited by a particular teleo-operated device. For example, as each of way-points A, B, D, F, and G have a number 1 in control map 446, device 1 can visit way-points A, B, D, F, and G, perhaps via a path traveling from way-point A, through way-points D, B, and G to way-point F, and then reverse course to return to way-point A.

Example Views and Teleo-Control Requests for Teleo-Experience Sessions

Figure 4C:
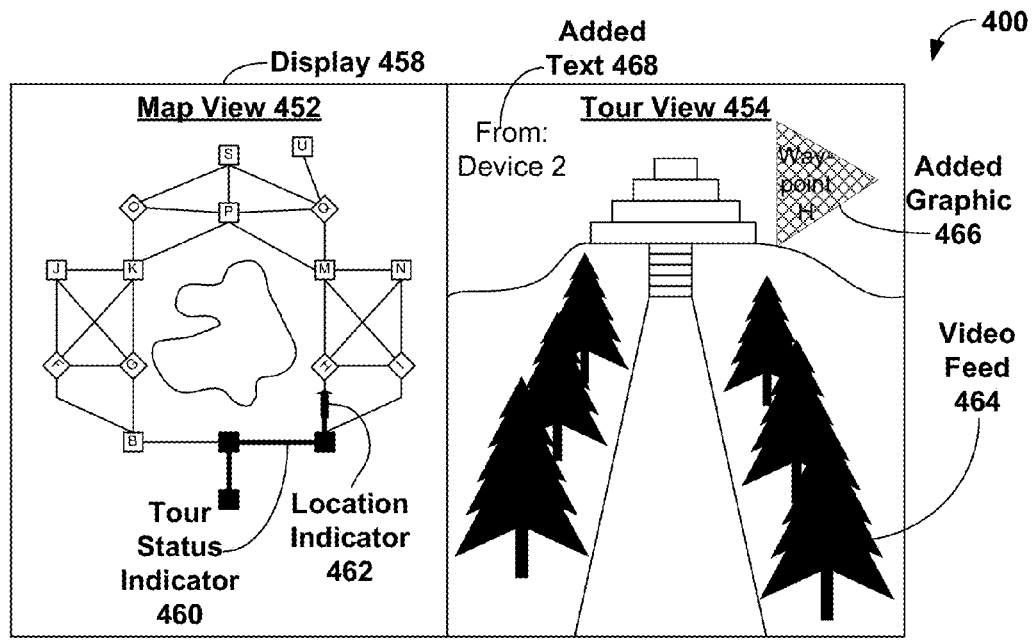
Figure 4C:
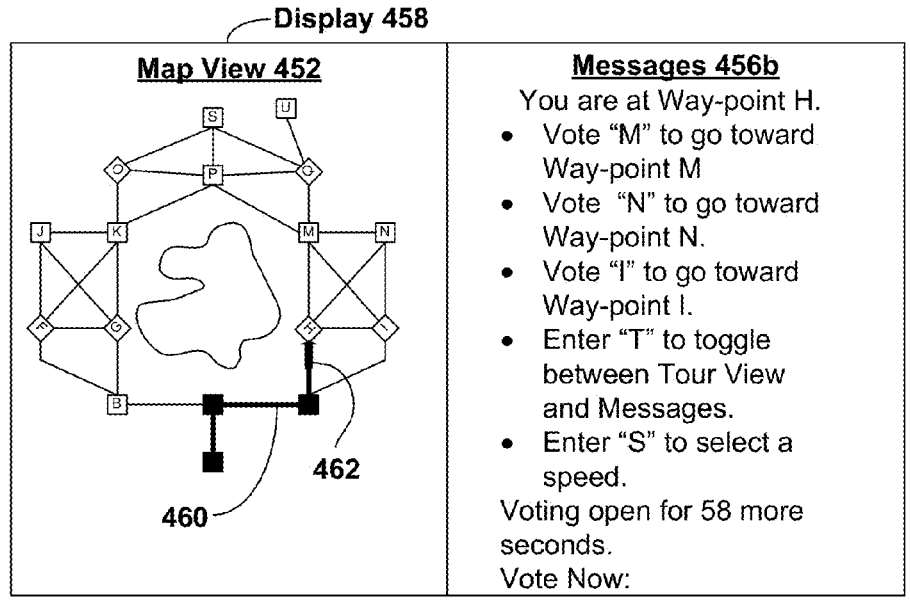
Figure 4D:
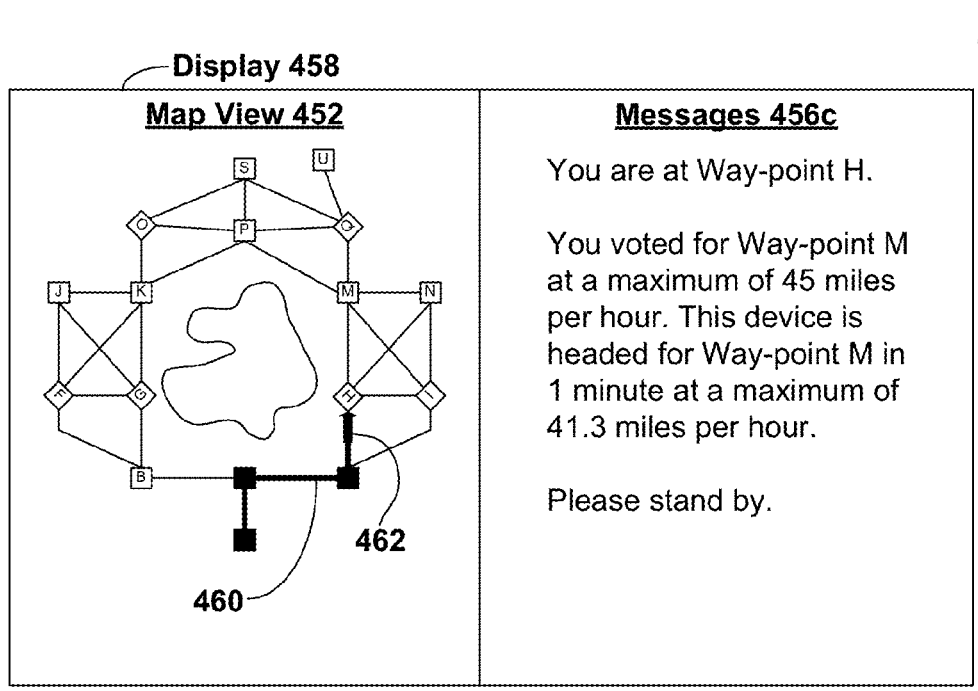
Figure 4D:
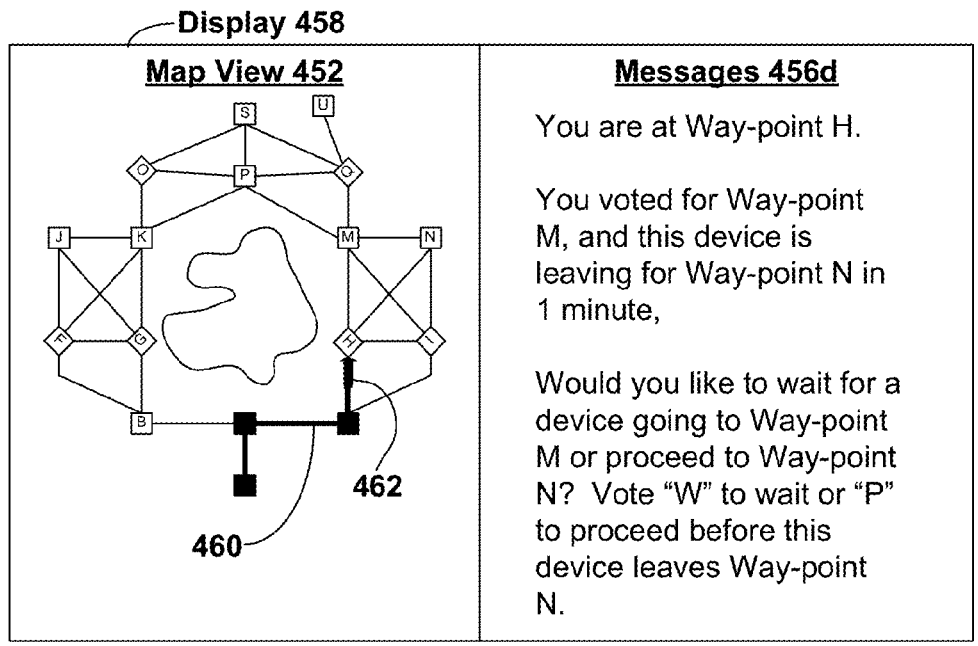
Figure 4E:
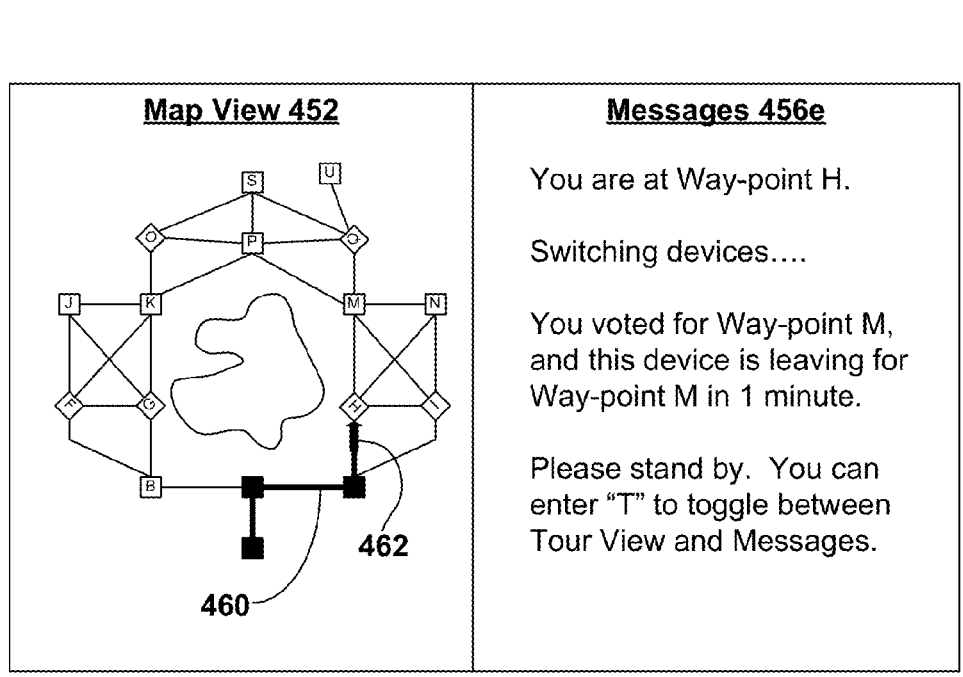
Figure 4E:
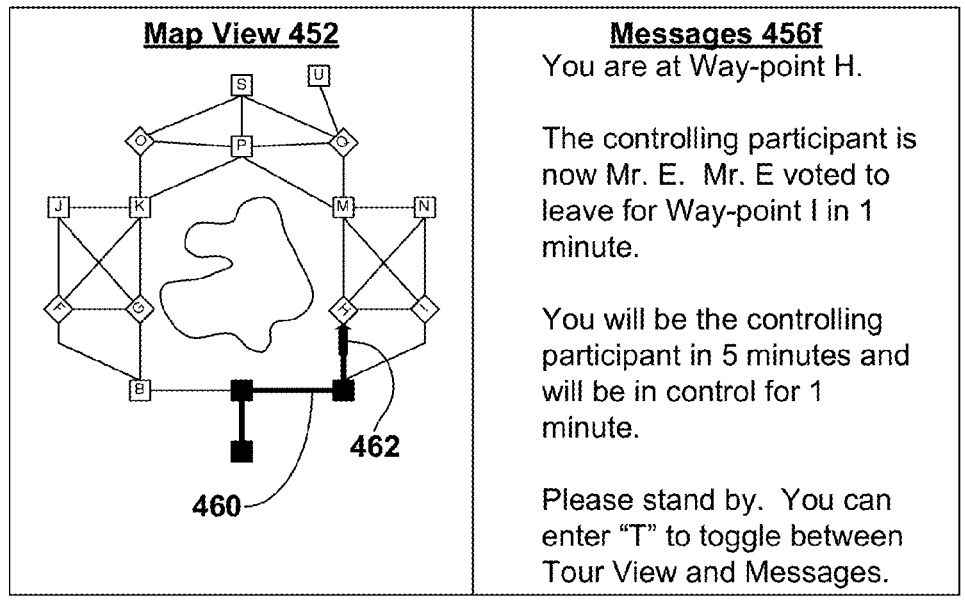

FIGS. 4C, 4D, and 4E show example views 452, 454, and 456b-456f for participants utilizing teleo-operated devices for a tour conducted using one or more teleo-experience sessions. At 450A of FIG. 4C, a map view 452 and tour view 454 are shown as part of display 458 configured for presentation to a participant of a tour of environment 402 using teleo-operated devices.

Map view 452 can provide an overview of the tour to a participant. As shown in FIG. 4C, map view 452 can include tour status indicator 460 indicating a part of the tour already completed with thicker lines or other displayable traits and a location indicator 462 indicating a current position of a teleo-operated device used in the teleo-experience session.

At 450A of FIG. 4C, tour view 454 is shown with video feed 464, added graphic 466 and added text 468. Video feed 464 can be a video feed from one or more cameras of the teleo-operated device used in the teleo-experience session by the participant. In some embodiments, video feed 464 can be an audio-video feed that can include audio taken from environment 402 via the teleo-operated device and/or audio provided from other source(s); e.g., pre-recorded or live narration for the tour, musical accompaniment, etc.

Added graphic 466 and added text 468 can provide additional information about video feed 464. For example, as shown in FIG. 4C, added graphic 466 can indicate a location of a way-point "Way-point H" and added text 468 can indicate a source device "Device 2" for video feed 464. Many other examples of added graphics and/or text are possible as well.

At 450B of FIG. 4C, the teleo-operated device is shown, via location indicator 462 of map view 452 in display 458, as being at way-point H. Also at 450B, messages 456b are displayed. Messages 456b informs the participant that the teleo-operated device is at way-point H, and that various options are available for voting to direct the teleo-operated device.

As shown in FIG. 4C, the options indicated by messages 456b include messages to vote for a direction of the teleo-operated device; e.g., "Vote 'M' to go toward Way-point M", "Vote 'N' to go toward Way-point N", and "Vote 'I' to go toward Way-point I." Also shown are entries to toggle between reviewing tour view 454 and messages 456b, and to change the parameter under selection; e.g., "Enter 'S' to select a speed." By entering the letter associated with a vote for a direction; e.g., a "M", an "N", or an "I", the participant can generate a teleo-operated request to move in that direction. Other mechanisms, such as touching or clicking on pre-determined area(s) of a screen such as images, button(s), and/or other graphical user interface elements, entering other numerical and/or textual commands and/or data, can be used to vote and/or generate teleo-operated requests as well.

As shown in FIG. 4C, messages 456b can also include an indication of time left to vote. The voting timer can be a timer to vote only on one or more specific parameters, or can be timer for votes on all selectable parameters. For example, suppose that at each way-point, participants can vote to select a direction parameter, a velocity/speed parameter, and a camera selection parameter (e.g., forward-facing or backward-facing). Each parameter—direction, velocity, and camera selection—can have a separate voting timer to specify a period of time to enter votes and generate/transmit subsequent teleo-operated request(s) for each specifiable parameter for the teleo-operated device, or can have a common timer to specify a period of time to enter votes and generate/transmit subsequent teleo-operated request(s) for all specifiable parameters.

Teleo-Control Instructions

Once the votes are made, the teleo-operated request(s) can be sent from computing device(s) used by the participant(s) to the server and/or teleo-operated device(s). The teleo-operated request can specify selection for one or more specifiable parameters; e.g., one or teleo-operated requests can specify votes for a direction of "left", a velocity of "45" and a camera selection of "forward". The server and/or teleo-operated device(s) can then generate a teleo-control instruction providing selection of the parameter(s) based on the votes.

The entries, such as the entries to change views and change the parameter under selection, may not lead to generation of a teleo-control request. For example, toggling views and/or changing parameters under selection can be performed by software running on a computing device used by the participant without teleo-control requests.

In scenario 400, the participant can be one of a plurality of participants using a teleo-operated device to tour environment 402 via teleo-experience session. The participants may be able to control various aspects or "parameters" of the teleo-operated device using one or more teleo-control requests. As mentioned above, a teleo-control request can be related to parameter(s) for teleo-operated device location, velocity, acceleration, maintenance, fuel/energy storage, and/or sensors aboard a teleo-operated device, among others.

A teleo-operated device can be controlled based on received teleo-control requests. These requests can be received at a server, such as teleo-operation server device, and/or a teleo-operated device. For example, suppose that the server receives five teleo-control requests specifying a direction parameter for a teleo-operated device TOD1. The server can select the direction parameter for TOD1 based on: popularity of the parameter option, a weighted or unweighted majority of the received options, a history of one or more previous selections, upon receiving a teleo-control request from a controlling participant, or using some other criteria.

Continuing this example, upon selection of the direction parameter for TOD1, the server can send a teleo-control instruction to TOD1 to change direction in accord with the selected direction parameter. In some embodiments, the server can send teleo-control instruction(s) to multiple teleo-operated devices simultaneously. For example, suppose nine teleo-operated devices, TOD1 to TOD9, were operating and a new teleo-operated device TOD10 was just put into service. Then, the server can simultaneously send a teleo-control instruction informing some or all of teleo-operated devices TOD1-TOD9 that TOD10 is available, perhaps information about a location, route, and/or capabilities associated with TOD10.

As another example, suppose that conditions in an area of the environment change; e.g., weather changes, routes are opened or closed, and/or way-points are added and/or removed. Then, the server can simultaneously send a teleo-control instruction to some or all teleo-operated devices about the changes in the environment and/or related instructions; e.g., all teleo-operated device return to the shop immediately due to expected inclement weather. Other examples of instructions sent to multiple teleo-operated devices simultaneously are possible as well.

In other embodiments, the server can send teleo-control instruction(s) to one or more participant devices as well. For example, suppose that three participating devices P1, P2, and P3 provide selections for the direction parameter for TOD1, and that the selected direction parameter was selected by P1 and P2, but not P3. Then, the server can send teleo-control instruction(s) to P3 to inform P3 that the direction parameter desired by P3 was not selected, to force P3 to wait for another teleo-operated device, and/or to request a selection between staying with TOD1 and waiting for another teleo-operated device. Many other teleo-control instructions are possible as well.

A weighted majority can be weighted based on point amounts received in the teleo-operated requests. Points can be provided to participants in a point account and later used by sending a point amount as part of a teleo-operated request. If the point amount is less than or equal to a number of points in the point account, the point amount can be deducted from the point account and the teleo-operated request can be weighted based on the point amount, perhaps by treating the request as having received point amount votes with a weight of one for the direction parameter. If the point amount is greater than the number of points in the point account, the teleo-operated request can be considered to use a pre-determined number of points (e.g., zero or one) for the teleo-operated request. Then, the server can determine a weighting of teleo-operated requests and use the weighted average to select a value of the parameter.

Points can be provided for free or based on fee payment to the participants. In some embodiments, points can be provided periodically to one or more participants. As an alternative, the points can be actual monetary amounts; e.g., the points can be replaced with fee payments.

For example, suppose four of the five requests were requests to turn "right", each request with a point amount of one point, and the fifth request was a request to turn "left" with a point amount of seven points, then the server can determine that there are four points in favor of turning right and seven points in favor of turning left, and therefore send a teleo-control instruction to turn left to the teleo-operated device, as the seven points in favor of turning left outweigh the four points for turning right.

In this example, a server generates the teleo-control instruction based on the votes made in the teleo-control requests. However, in other examples, one or more teleo-operated devices can be configured to generate teleo-control instructions based on votes made in teleo-control requests.

At 450C of FIG. 4D, messages 456c shows an example message for a successful vote for a direction parameter. Messages 456c indicate that the participant "voted for Way-point M." In this instance, the server can inform the user that their vote was successful, by indicating that "this device is headed for Way-point M in 1 minute."

The server can also provide information about selections made for continuous or range-valued variables. In scenario 400, suppose that a maximum speed variable can take any value from 25 to 45 miles/hour. In this instance, the server can inform the user of voted-for and/or chosen values of continuous or range-valued variables via one or more messages. For example, at 450C of FIG. 4D, messages 456c indicate that the participant "voted for . . . a maximum of 45 miles per hour" for a speed variable and "This device is headed . . . at a maximum of 41.3 miles per hour."

In contrast, at 450D of FIG. 4D, messages 456d shows an example message for an unsuccessful vote for a direction parameter. Messages 456d indicate that the participant "voted for Way-point M" and "this device is headed for Way-point N in 1 minute." Messages 456d also informs the participant of two options in response to the unsuccessful vote: either "wait for a device going to Way-point M" by voting "W" or "proceed to Way-point N" by voting "P".

In the event that the participant decides to proceed to Way-point N, then the participant can continue with the teleo-experience session of the tour with the same device to Way-point N. However, in the event the participant decides to wait for a device going to Way-point M, the participant can wait at a current position; e.g., Way-point H, until the arrival of a teleo-operated device destined for a desired location; e.g., Way-point N. Then, the participant can continue with the teleo-experience session of the tour using the arrived device to the desired location.

Use of Multiple Teleo-Operated Devices in a Teleo-Experience Session

At 450E of FIG. 4E, example messages 456E indicate the arrival of the teleo-operated device destined for the desired location and that the participant is "Switching devices" to the arrived teleo-operated device. Messages 456E can remind the participant of the selection for "Way-point M" and inform the participant that "this device is leaving for Way-point M in 1 minute." In some embodiments, the waiting participant can vote to control parameters of the teleo-operated device destined for the desired location; e.g., a velocity parameter.

Along with messages 456e, the participant can be provided with a video feed from the current location where the participant is waiting in a Tour View; e.g., a video feed from a camera at Way-point H, until the teleo-operated device destined for the desired location arrives. Then, the video feed of the Tour View can be transferred from the current location to view images from the teleo-operated device destined for the desired location.

In other embodiments, one or more controlling participants can be designated for part or all of the tour. The controlling participant can be a tour guide, professional teleo-operated device driver, or other person designated as the controlling participant. The controlling participant can be selected based on fee payment; e.g., pay $X to drive the teleo-operated device for Y minutes or pay $2X to drive for 3Y minutes.

In still other embodiments, the controlling participant can be selected by as a most popular participant among the participants, perhaps using a controlling-participant selection or parameter of a teleo-control request. That is, the participants can use teleo-control requests with a parameter indicating a controlling participant, or use some other mechanism, to vote to select a controlling participant. Then, the most popular participant, based on the vote, can be selected as the controlling participant.

In even other embodiments, the server can track how often each voter has voted for a chosen parameter. Then, one or more "bellwether" participants, or most-commonly-successful voters, can be determined by the server. For example, suppose ten participants had each voted five times for various parameters. In this example, suppose participants #2 and #7 had each voted for the chosen parameter each of the five times with the other participants voting for the chosen parameter fewer than five times. Then, by being voters who most commonly chose actually selected parameters, the server can determine that participants #2 and/or #7 are bellwether voters.

Then, the bellwether voter(s) can be selected controlling participant(s) and/or provide additional weight in voting. The effect this would have is that, when there are missing voters and/or no consensus, the bellwether voter(s) have/has been at a center of mass of user preference in the past will be trusted to decide what to do for absent votes or failing consensus. For example, suppose ten participants were participating in a teleo-experience session, and only nine votes were received for a particular parameter, including one vote from a bellwether voter. Then, the server can use a selection provided by a bellwether voter as an implied selection by the absent voter. As another example, suppose the ten participants all voted for a direction with two choices: "left" or "right" with five "left" votes, including a bellwether voter's vote, and five "right" votes without a bellwether voter's vote. Then, to break this tie, the server can add the fact that the "left" direction had a bellwether voter's vote, but not "right", and so select "left" as the direction.

In some scenarios, the participants may be able to vote for multiple controlling participants. For example, suppose a teleo-experience session lasts two hours, which is 120 minutes. In this example, each controlling participant can have a term of a fixed for variable duration. If the term length were five minutes, up to twenty-four different participants could act as the controlling participant during the 120-minute example teleo-experience session. The controlling participants can be selected all at once, perhaps just before the teleo-experience session begins, or just before each term as controlling participant expires. Unweighted or weighted voting, such as discussed above, can be used to select controlling participants based on popularity.

In yet other embodiments, the controlling participant can be selected by round-robin or similar selection; e.g., suppose three participants A, B, and C are using a teleo-operated device for a two-hour teleo-experience session. Then, each participant can be the controlling participant for a fixed or variable length term chosen in round-robin fashion. That is, participant A can control the teleo-operated device for the first term, participant B can control the teleo-operated device for the second term, participant C can control the teleo-operated device for the third term, and then participant A can retake control for the fourth term and so on.

In some scenarios, not all participants can be selected in via the round-robin selection. For example, suppose that participant B is unwilling and/or unable to act as the controlling participant. Then, participants A and C can act as controlling participants term-by-term as selected in a round robin fashion. Other processes beyond round-robin for selecting a controlling participant are possible as well; e.g., first-in-first-out, last-in-first-out, most recently added participant controls, voting for a controlling participant for part or all of the tour, and/or a combination of these processes.

Example messages 456*f* related to controlling participants are shown at 450F of FIG. 4E. FIG. 4E shows messages 456*f* that inform the participant that the "controlling participant is now Mr. E" who "voted to leave for Way-point I in 1 minute." Also, FIG. 4E shows messages 456*f* that can inform the participant of about a schedule for controlling participation by informing the participant that "[y]ou will be the controlling participant in 5 minutes and will be in control for 1 minute." Messages 456*f* can also inform the participant of other options, such as toggling between tour view and messages.

In some embodiments, a controlling participant can be permitted to view additional views not available to non-controlling participants, such as part or all of control view 440, views and/or controls for controlling the teleo-operated device manually, additional information about device speed, direction, velocity, acceleration, energy, and/or other information. Other additional views for controlling participants are possible as well.

In other embodiments, a non-controlling participant who desires to leave a device controlled by a controlling participant can leave the teleo-operated device, perhaps at a waypoint, and wait for another teleo-operated device to continue the teleo-experience session.

Example Operation

Figure 5:
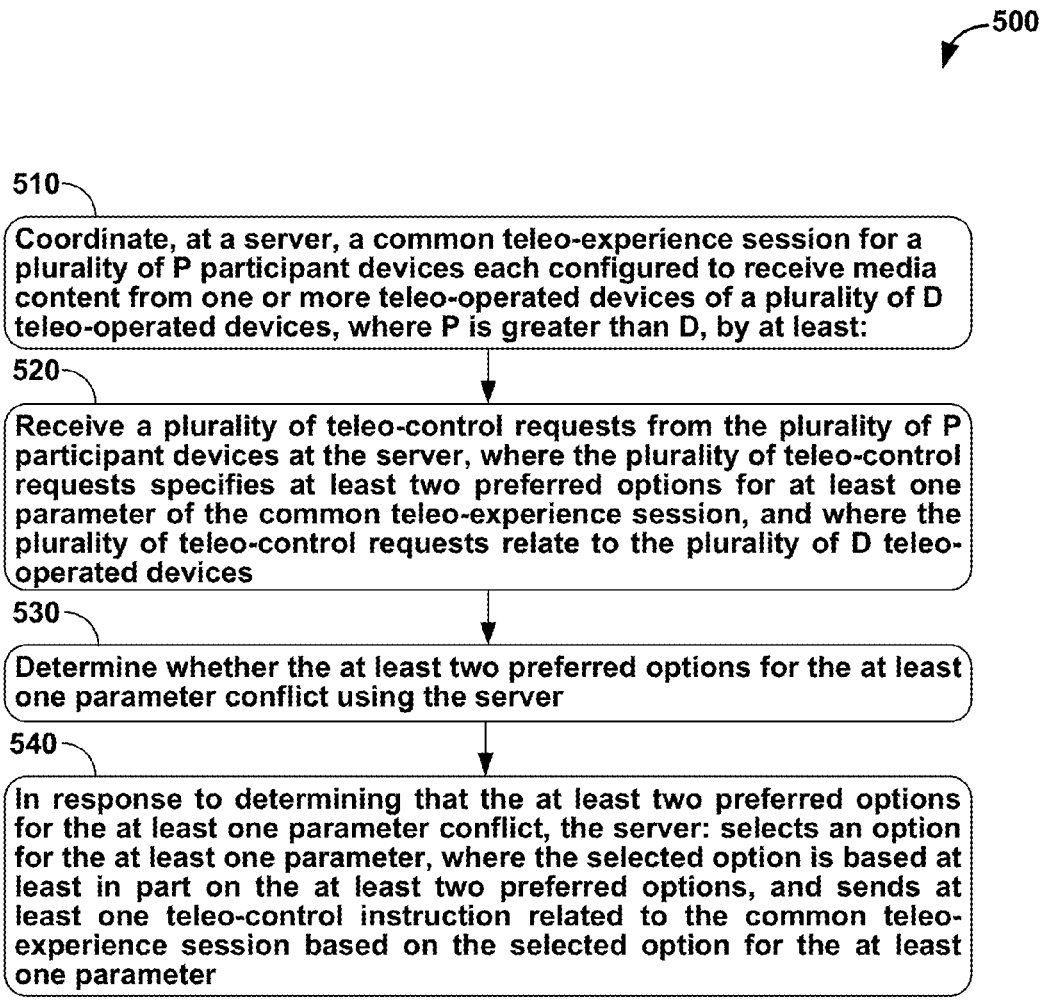
FIG. 5 is a flow chart of one method in accordance with an example embodiment.

FIG. 5 is a flow chart of an example method 500 in accordance with an example embodiment. At block 510, a common teleo-experience session for a plurality of P participant devices each configured to receive media content from one or more teleo-operated devices of a plurality of D teleo-operated devices is coordinated, with P greater than D. The common teleo-experience session can be coordinated at a server and/or at one or more teleo-operated devices.

The coordination of the common teleo-experience session can involve performing at least the techniques of at least discussed immediately below in the context of blocks 520-540. At block 520, a plurality of teleo-control requests related to a teleo-experience session from two or more of a number of participant devices is received. The plurality of teleo-control requests can be received at the server and/or at the one or more teleo-operated devices coordinating the common teleo-experience session or perhaps by other device(s). The plurality of teleo-control requests can specify at least two preferred options for at least one parameter of the teleo-experience session. The plurality of teleo-control requests can relate to the plurality of D teleo-operated devices.

At block 530, a determination can be made whether the at least two preferred options for the at least one parameter conflict. The determination can be made at the server and/or at the one or more teleo-operated devices coordinating the common teleo-experience session or perhaps by other device (s).

At block 540, in response to determining that the at least two preferred options for the at least one parameter conflict: an option for the at least one parameter can be selected and at least one teleo-control instruction related to the common teleo-experience session can be sent based on the selected option for the at least one parameter. The selected option can be based at least in part on the at least two preferred options. The option can be selected and the at least one teleo-control option can be sent from the server and/or the one or more teleo-operated devices coordinating the common teleo-experience session or perhaps by other device(s).

Figure 6:
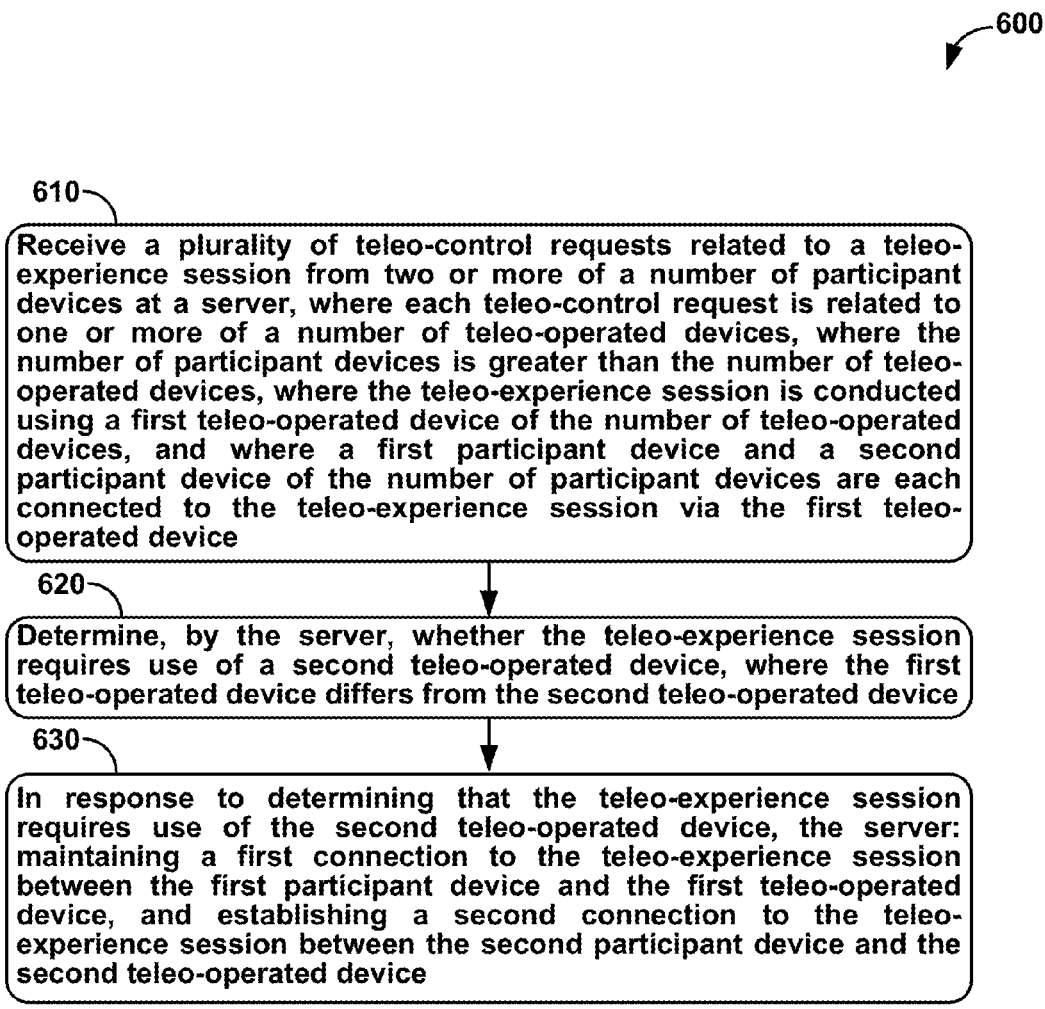
FIG. 6 is a flow chart of another method in accordance with an example embodiment.

FIG. 6 is a flow chart of an example method 600 in accordance with an example embodiment. At block 610, a plurality of teleo-control requests related to a teleo-experience session from two or more of a number of participant devices is received. The plurality of teleo-control requests can be received at a server and/or at one or more teleo-operated devices. Each teleo-control request can be related to one or more of a number of teleo-operated devices. The number of participant devices is greater than the number of teleo-operated devices. The teleo-experience session can be conducted using a first teleo-operated device of the number of teleo-operated devices. A first participant device and a second participant device of the number of participant devices can each connected to the teleo-experience session via the first teleo-operated device. For example, the first and second selections can both relate to a direction of travel of the first teleo-operated device.

At block 620, a determination can be made whether the teleo-experience session requires use of a second teleo-operated device that differs from the first teleo-operated device. The determination can be made by the server and/or at one or more teleo-operated devices that receives the plurality of teleo-control requests, or perhaps by other device(s).

At block 630, in response to determining that the teleo-experience session requires use of the second teleo-operated device: a first connection to the teleo-experience session between the first participant device and the first teleo-operated device can be maintained and a second connection to the teleo-experience session between the second participant device and the second teleo-operated device can be established. Maintaining the first connection and establishing the second connection can be performed by the server and/or at one or more teleo-operated devices that receives the plurality of teleo-control requests, or perhaps by other device(s).

Figure 7:
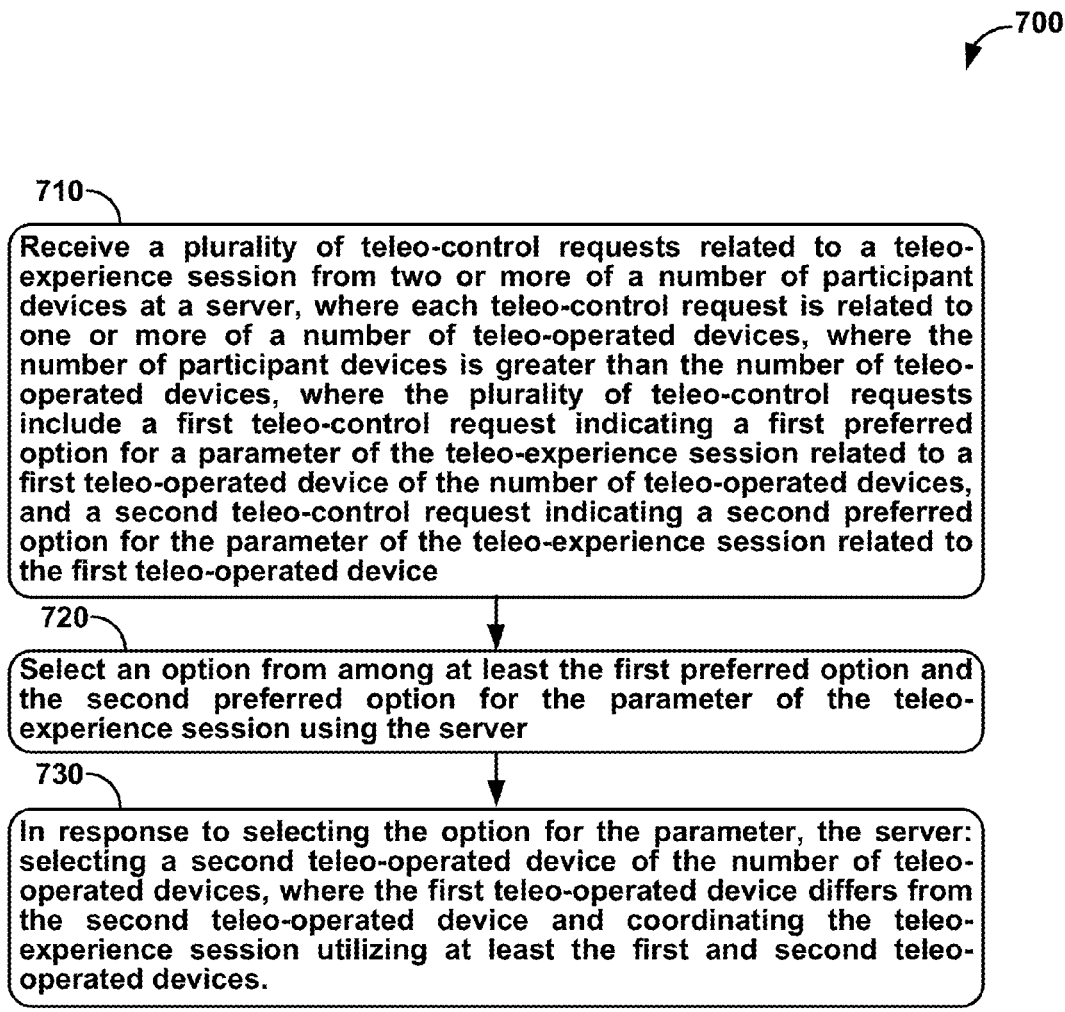
FIG. 7 is a flow chart of yet another method in accordance with an example embodiment.

FIG. 7 is a flow chart of an example method 700 in accordance with an example embodiment. At block 710, a plurality of teleo-control requests related to a teleo-experience session from two or more of a number of participant devices are received. Each teleo-control request can be related to one or more of a number of teleo-operated devices. The number of participant devices is greater than the number of teleo-operated devices. The plurality of teleo-control requests can be received at a server and/or at one or more teleo-operated devices. The plurality of teleo-control requests can include at least a first teleo-control request that indicates a first preferred option for a parameter of the teleo-experience session related to a first teleo-operated device of the number teleo-operated devices, and a second teleo-control request that indicates a second preferred option for the parameter of the teleo-experience session related to the first teleo-operated device.

At block 720, an option for the parameter of the teleo-experience session can be selected from among at least the first preferred option and the second preferred option. The selection can be made by the server and/or at one or more teleo-operated devices that receives the plurality of teleo-control requests, or perhaps by other device(s). In some embodiments, the option can be selected from among at least the first preferred option, the second preferred option, and at least a third preferred option.

At block 730, in response to selecting the option for the parameter: a second teleo-operated device from the number of teleo-operated devices can be selected, and the teleo-experience session can be coordinated utilizing at least the first and second teleo-operated devices. The selection of the second teleo-operated device and coordination of the teleo-experience session can be performed by the server and/or at one or more teleo-operated devices that receives the plurality of teleo-control requests, or perhaps by other device(s).

In some embodiments, the first teleo-operated device is configured to operate using the selected option for the parameter, and the second teleo-operated device is configured to operate using an unselected operation for the parameter. In other embodiments, selecting the second teleo-operated device can include selecting the second teleo-operated device, and at least a third teleo-operated device, where the first teleo-operated device, the second teleo-operated device, and the third teleo-operated device all differ. In these other embodiments, coordinating the teleo-experience session can include coordinating the teleo-experience session utilizing the first teleo-operated device, the second teleo-operated device, and the at least the third teleo-operated device.

CONCLUSION

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method, comprising:
coordinating, at a server, a common teleo-experience session for a plurality of P participant devices each configured to receive media content from one or more teleo-operated devices of a plurality of D teleo-operated devices, wherein P is greater than D, wherein coordinating the common teleo-experience session comprises:
receiving a plurality of teleo-control requests from the plurality of P participant devices at the server, wherein the plurality of teleo-control requests specifies at least two preferred options for at least one parameter of the common teleo-experience session, and wherein the plurality of teleo-control requests relate to the plurality of D teleo-operated devices;
determining whether the at least two preferred options for the at least one parameter conflict using the server; and
in response to determining that the at least two preferred options for the at least one parameter conflict, the server:
selecting an option for the at least one parameter based on one or more rules, wherein the selected option is selected from the at least two preferred options, and wherein the one or more rules comprise a rule indicating a permissible location for operating at least one of the plurality of D teleo-operated devices, and sending at least one teleo-control instruction related to the common teleo-experience session based on the selected option for the at least one parameter.

2. The computer-implemented method of claim 1, wherein sending the at least one teleo-control instruction comprises sending the at least one teleo-control instruction to a participant device of the plurality of P participant devices.

3. The computer-implemented method of claim 1, wherein sending the at least one teleo-control instruction comprises sending the at least one teleo-control instruction to a teleo-operated device of the plurality of D teleo-operated devices.

4. The computer-implemented method of claim 1, wherein selecting the option of the at least one parameter comprises:
   determining a popular option for the at least one parameter; and
   selecting the popular option as the selected option of the at least one parameter.

5. The computer-implemented method of claim 4, wherein the popular option is based on an unweighted majority of the plurality of requests that comprise a selection of the option of the at least one parameter.

6. The computer-implemented method of claim 4, wherein the popular option is based on a weighting of the plurality of requests that comprise a selection of the option of the at least one parameter.

7. The computer-implemented method of claim 6, wherein the weighting of the plurality of requests is weighted based on fee payment.

8. The computer-implemented method of claim 6, wherein the weighted majority is weighted based on points provided to each participant over time.

9. The computer-implemented method of claim 1, wherein selecting the option of the at least one parameter comprises selecting the option of the at least one parameter based on a previous selection of the option.

10. The computer-implemented method of claim 7, wherein the previous selection comprises a selection made by during a teleo-experience session that occurred prior to the common teleo-experience session.

11. The computer-implemented method of claim 7, wherein the previous selection comprises a selection made by participants in the common teleo-experience session prior to a start of the common teleo-experience session.

12. The computer-implemented method of claim 1, wherein the one or more rules comprise a rule governing safety and/or physical constraints of a teleo-operated device in the plurality of D teleo-operated devices.

13. The computer-implemented method of claim 1, wherein a teleo-operated device in the plurality of D teleo-operated devices is operating in an environment, and wherein the one or more rules comprise a rule governing the environment.

14. The computer-implemented method of claim 1, wherein the one or more rules comprise a rule governing a duration of a session for operating at least one of the plurality of D teleo-operated devices.

15. The computer-implemented method of claim 1, further comprising: starting a second teleo-experience session separate from the common teleo-experience session.

16. The computer-implemented method of claim 15, wherein coordinating the common teleo-experience session comprises:

operating the common teleo-experience session utilizing at least a first teleo-operated device of the plurality of teleo-operated devices; and operating the second teleo-experience session utilizing at least a second teleo-operated device of the plurality of teleo-operated devices, wherein the first teleo-operated device differs from the second teleo-operated device.

17. The computer-implemented method of claim 16, further comprising:
   determining that the selected option for at least one parameter of the common teleo-experience session comprises the first preferred option;
   providing the first preferred option to the first teleo-operated device as part of the common teleo-experience session; and
   providing the second preferred option to the second teleo-operated device as part of the second teleo-experience session.

18. The computer-implemented method of claim 1, further comprising:
   selecting a controlling participant of the plurality of the P participant devices.

19. The computer-implemented method of claim 18, wherein selecting the option for the at least one parameter of the common teleo-experience session comprises:
   receiving a controlling-participant selection of the option for the at least one parameter from the controlling participant; and
   selecting the controlling-participant selection as the option for the at least one parameter of the common teleo-experience session.

20. The computer-implemented method of claim 18, wherein selecting the controlling participant comprises selecting the controlling participant on a round-robin basis.

21. The computer-implemented method of claim 20, wherein selecting the controlling participant comprises selecting the controlling participant on a round-robin basis among some, but not all, of the P participants.

22. The computer-implemented method of claim 20, wherein selecting the controlling participant comprises selecting the controlling participant on a round-robin basis among all of the P participants.

23. The computer-implemented method of claim 18, wherein selecting the controlling participant comprises:
   determining a popular participant among the P participants; and
   selecting the popular participant as the controlling participant.

24. The computer-implemented method of claim 23, wherein selecting the popular participant as the controlling participant comprises selecting the popular participant based on an unweighted vote of the participants.

25. The computer-implemented method of claim 23, wherein selecting the popular participant as the controlling participant comprises selecting the popular participant based on a weighted vote of the participants.

26. The computer-implemented method of claim 25, wherein the weighted vote is weighted based on fee payment.

27. The computer-implemented method of claim 25, wherein the weighted vote is weighted based on points provided to each participant over time.

28. The computer-implemented method of claim 23, wherein selecting the popular participant as the controlling participant comprises:
   conducting a plurality of votes of the participants;

for each vote of the plurality of votes, determining a successful choice of the vote, and determining one or more participants associated with the successful choice;

determining a bellwether voter based on the one or more participants associated with the successful choices of the plurality of votes; and selecting the bellwether voter as the controlling participant.

29. The computer-implemented method of claim 1, wherein the server is configured to determine that use of at least two teleo-operated devices of the plurality of teleo-operated devices resolves the conflict between the at least two first preferred options.

30. The computer-implemented method of claim 1, wherein the at least one parameter comprises a continuous parameter, and wherein selecting an option for the at least one parameter comprises:

determining an average value of the preferred options for the continuous parameter; and selecting the average value as the selected option.

31. A server, comprising:

at least one processor; and a non-transitory computer-readable medium, having one or more instructions that, in response to execution by the at least one processor, cause the server to perform functions comprising:

coordinating a common teleo-experience session for a plurality of P participant devices each configured to receive media content from one or more teleo-operated devices of a plurality of D teleo-operated devices, wherein P is greater than D by at least:

receiving a plurality of teleo-control requests from the plurality of P participant devices, wherein the plurality of teleo-control requests specifies at least two preferred options for at least one parameter of the common teleo-experience session, and wherein the plurality of teleo-control requests relate to the plurality of D teleo-operated devices, determining whether the at least two preferred options for the at least one parameter conflict using the server, and in response to determining that the at least two preferred options for the at least one parameter conflict:

selecting an option for the at least one parameter based on one or more rules, wherein the selected option is based at least in part on the at least two preferred options, and wherein the one or more rules comprise a rule indicating a permissible location for operating at least one of the plurality of D teleo-operated devices, and sending at least one teleo-control instruction based on the selected option for the at least one parameter.

32. The server of claim 31, wherein sending the at least one teleo-control instruction comprises sending the at least one teleo-control instruction to a participant device of the plurality of P participant devices.

33. The server of claim 31, wherein sending the at least one teleo-control instruction comprises sending the at least one teleo-control instruction to a teleo-operated device of the plurality of D teleo-operated devices.

34. A system, comprising:

means for coordinating a common teleo-experience session for a plurality of P participant devices each configured to receive media content from one or more teleo-operated devices of a plurality of D teleo-operated devices, wherein P is greater than D, the means for coordinating comprising:

means for receiving a plurality of teleo-control requests from the plurality of P participant devices, wherein the plurality of teleo-control requests specifies at least two preferred options for at least one parameter of the common teleo-experience session, and wherein the plurality of teleo-control requests relate to the plurality of D teleo-operated devices, means for determining whether the at least two preferred options for the at least one parameter conflict, and means for, in response to determining that the at least two preferred options for the at least one parameter conflict:

selecting an option for the at least one parameter based on one or more rules, wherein the selected option is based at least in part on the at least two preferred options, and wherein the one or more rules comprise a rule indicating a permissible location for operating at least one of the plurality of D teleo-operated devices, and sending at least one teleo-control instruction based on the selected option for the at least one parameter.

35. The system of claim 34, wherein the means for sending the at least one teleo-control instruction comprises means for sending the at least one teleo-control instruction to a participant device of the plurality of P participant devices.

36. The system of claim 34, wherein means for sending the at least one teleo-control instruction comprises means for sending the at least one teleo-control instruction to a teleo-operated device of the plurality of D teleo-operated devices.

37. A computer-implemented method, comprising:

receiving a plurality of teleo-control requests related to a teleo-experience session from two or more of a number of participant devices at a server, wherein each teleo-control request is related to one or more of a number of teleo-operated devices, wherein the number of participant devices is greater than the number of teleo-operated devices, wherein the teleo-experience session is conducted using a first teleo-operated device of the number of teleo-operated devices, and wherein a first participant device and a second participant device of the number of participant devices are each connected to the teleo-experience session via the first teleo-operated device;

determining, by the server, whether the teleo-experience session requires use of a second teleo-operated device by at least determining whether a first selection related to the teleo-experience session provided from the first participant device conflicts with a second selection related to the teleo-experience session provided from the second participant device, wherein the first teleo-operated device differs from the second teleo-operated device; and in response to determining that the teleo-experience session requires use of the second teleo-operated device, the server:

maintaining a first connection to the teleo-experience session between the first participant device and the first teleo-operated device, and establishing a second connection to the teleo-experience session between the second participant device and the second teleo-operated device.

38. The computer-implemented method of claim 37, wherein the first selection and the second selection both relate to a direction of travel of the first teleo-operated device.

39. The computer-implemented method of claim 37, wherein the number of participant devices comprises at least a third participant device and a fourth participant device, wherein the third participant device selected the first selection, wherein the second participant device selected the second selection, wherein maintaining the first connection to the teleo-experience session comprises mainlining the first connection to the teleo-experience session between the third participant device and the first teleo-operated device, and wherein establishing a second connection to the teleo-experience session comprises establishing a connection between the fourth participant device and the second teleo-operated device.

40. The computer-implemented method of claim 37, wherein establishing the second connection comprises tearing down a connection to the teleo-experience session between the second participant device and the first teleo-operated device.

41. The computer-implemented method of claim 37, wherein establishing the second connection comprises maintaining a third connection to the teleo-experience session between the second participant device and the first teleo-operated device.

42. The computer-implemented method of claim 37, wherein establishing the second connection comprises maintaining the second connection and the third connection simultaneously.

43. A server, comprising:
  at least one processor; and
  a non-transitory computer-readable medium, having one or more instructions that, in response to execution by the at least one processor, cause the server to perform functions comprising:
    receiving a plurality of teleo-control requests related to a teleo-experience session from two or more of a number of participant devices, wherein each teleo-control request is related to one or more of a number of teleo-operated devices, wherein the number of participant devices is greater than the number of teleo-operated devices, wherein the teleo-experience session is conducted using a first teleo-operated device of the number of teleo-operated devices, and wherein a first participant device and a second participant device of the number of participant devices are each connected to the teleo-experience session via the first teleo-operated device,
    determining whether the teleo-experience session requires use of a second teleo-operated device by at least determining whether a first selection related to the teleo-experience session provided from the first participant device conflicts with a second selection related to the teleo-experience session provided from the second participant device, wherein the first teleo-operated device differs from the second teleo-operated device, and
    in response to determining that the teleo-experience session requires use of the second teleo-operated device:
      maintaining a first connection to the teleo-experience session between the first participant device and the first teleo-operated device, and
      establishing a second connection to the teleo-experience session between the second participant device and the second teleo-operated device.

44. A system, comprising:
  means for receiving a plurality of teleo-control requests related to a teleo-experience session from two or more of a number of participant devices, wherein each teleo-control request is related to one or more of a number of teleo-operated devices, wherein the number of participant devices is greater than the number of teleo-operated devices, wherein the teleo-experience session is conducted using a first teleo-operated device of the number of teleo-operated devices, and wherein a first participant device and a second participant device of the number of participant devices are each connected to the teleo-experience session via the first teleo-operated device;
  means for determining whether the teleo-experience session requires use of a second teleo-operated device comprising means for determining whether a first selection related to the teleo-experience session provided from the first participant device conflicts with a second selection related to the teleo-experience session provided from the second participant device, wherein the first teleo-operated device differs from the second teleo-operated device; and
  means for, in response to determining that the teleo-experience session requires use of the second teleo-operated device:
    maintaining a first connection to the teleo-experience session between the first participant device and the first teleo-operated device, and
    establishing a second connection to the teleo-experience session between the second participant device and the second teleo-operated device.

45. A computer-implemented method, comprising:
  receiving a plurality of teleo-control requests related to a teleo-experience session from two or more of a number of participant devices at a server, wherein each teleo-control request is related to one or more of a number of teleo-operated devices, wherein the number of participant devices is greater than the number of teleo-operated devices, wherein the plurality of teleo-control requests comprise a first teleo-control request indicating a first preferred option for a parameter of the teleo-experience session related to a first teleo-operated device of the number of teleo-operated devices, and a second teleo-control request indicating a second preferred option for the parameter of the teleo-experience session related to the first teleo-operated device;
  selecting an option from among at least the first preferred option and the second preferred option for the parameter of the teleo-experience session using the server; and
  in response to selecting the option for the parameter, the server:
    selecting a second teleo-operated device of the number of teleo-operated devices, wherein the first teleo-operated device differs from the second teleo-operated device, and
    coordinating the teleo-experience session utilizing at least the first and second teleo-operated devices by at least operating the first teleo-operated device is configured to operate using the selected option for the parameter, and the second teleo-operated device is configured to operate using an unselected operation for the parameter.

46. The method of claim 45, wherein the plurality of teleo-control requests comprise the teleo-control request indicating the first preferred option, the teleo-control request indicating the second preferred option, and a teleo-control request indicating a third preferred option;
  wherein selecting the option comprises selecting an option for the parameter from among at least the first preferred option, the second preferred option, and the third preferred option;

wherein selecting the second teleo-operated device comprises selecting the second teleo-operated device, and at least a third teleo-operated device, wherein the first teleo-operated device, the second teleo-operated device, and the at least the third teleo-operated device all differ; and wherein coordinating the teleo-experience session comprises coordinating the teleo-experience session utilizing the first teleo-operated device, the second teleo-operated device, and the at least the third teleo-operated device.

* * * * *